US012390904B2

(12) United States Patent
Purnomohadi

(10) Patent No.: US 12,390,904 B2
(45) Date of Patent: Aug. 19, 2025

(54) TOOL HAVING MATING PLIER JAW PAIRS

(71) Applicant: LEATHERMAN TOOL GROUP, INC., Portland, OR (US)

(72) Inventor: Andro Purnomohadi, Vancouver, WA (US)

(73) Assignee: LEATHERMAN TOOL GROUP, INC., Portland, OR (US)

( * ) Notice: Subject to any disclaimer, the term of this patent is extended or adjusted under 35 U.S.C. 154(b) by 613 days.

(21) Appl. No.: 17/650,533

(22) Filed: Feb. 10, 2022

(65) Prior Publication Data

US 2023/0249321 A1 Aug. 10, 2023

(51) Int. Cl.
*B25B 7/12* (2006.01)
*B25B 7/02* (2006.01)
*B25B 7/22* (2006.01)

(52) U.S. Cl.
CPC .................. *B25B 7/12* (2013.01); *B25B 7/02* (2013.01); *B25B 7/22* (2013.01)

(58) Field of Classification Search
CPC .... B25B 7/08; B25B 7/02; B25B 7/12; B25B 7/22; B26B 11/00; B26B 26/11
USPC ........................................ 81/304–306; 7/128
See application file for complete search history.

(56) References Cited

U.S. PATENT DOCUMENTS 2,747,446 A * 5/1956 Eder ......................... B25B 7/02 81/304
4,238,862 A 12/1980 Leatherman
5,724,871 A * 3/1998 Wall ..................... H02G 1/1212 81/9.43

* cited by examiner

*Primary Examiner* — Hadi Shakeri
(74) *Attorney, Agent, or Firm* — ALSTON & BIRD LLP

(57) ABSTRACT

A tool is provided in order to facilitate utilization by users in a wide variety of applications. By way of example, a multipurpose tool includes a first handle having a first axle and a second handle having a second axle; a first jaw and a second jaw, defining a stowed position and a deployed position, where in the stowed position the first jaw is received within the second handle and the second jaw is received within the first handle; a third jaw and a fourth jaw, defining a stowed position and a deployed position, where in the stowed position the third jaw is received within the second handle and the fourth jaw is received within the first handle, where the first jaw and fourth jaw are pivotably attached at the second axle, the second jaw and third jaw are pivotably attached at the first axle.

15 Claims, 28 Drawing Sheets

TOOL HAVING MATING PLIER JAW PAIRS

TECHNOLOGICAL FIELD

An example embodiment relates generally to a tool having two or more pairs of mating plier jaws, and in one embodiment, to a tool having a first pair of plier jaws of a first length and a second pair of plier jaws having a second length that mate with the first pair of plier jaws.

BACKGROUND

Tools, such as multipurpose tools, are widely popular for their utility in a number of different applications. A multipurpose tool includes a number of tool members carried by a common frame. A multipurpose tool may include different combinations of tool members depending upon its intended application. For example, multipurpose tools that are designed for a more universal or generic application can include pliers, a wire cutter, a bit driver, one or more knife blades, a saw blade or the like. Other multipurpose tools are designed to service more specific applications or niche markets and correspondingly include tool members that are useful for the intended application. For example, multipurpose tools may be specifically designed for automobile repair, hunting, fishing or other outdoor applications, gardening, snow skiing, snowboarding, bicycling or other recreational activities as well as military and emergency medical applications, to name a few.

One reason for the popularity of multipurpose tools is the capability provided by a multipurpose tool to provide a wide range of functionality with a single tool, thereby reducing the need to carry a number of different tools to perform the same functions. For example, a single multipurpose tool may be carried instead of a pair of pliers, one or more screwdrivers, a knife and a bottle opener. As such, the burden placed upon the user is reduced since the user need only carry a single multipurpose tool.

As multipurpose tools are frequently carried by users in the field, it is desirable for the multipurpose tools to be relatively small and lightweight, while remaining rugged so as resist damage. In order to reduce the overall size of a multipurpose tool, some multipurpose tools have been designed to be foldable. In this regard, foldable multipurpose tools are designed to be alternately folded into a closed position and an open position. Generally, the closed position is more compact with the multipurpose tool frequently being carried in the closed position. Conversely, while the open position is generally less compact than the closed position, the open position generally allows the deployment of one or more of the tool members that are stowed and relatively inaccessible when the multipurpose tool is in the closed position.

For example, a multipurpose tool may include pliers having a pair of jaws connected to respective handles. In the open position, the pliers are deployed and are capable of being actuated by moving the handles toward and away from one another. In the closed position, the handles are folded about the pliers such that the pliers are no longer functional and are instead, positioned within the handles. In the closed position, however, the multipurpose tool is more compact with the form factor generally defined by the proximal relationship with the handles.

In addition to the pliers that are deployed as the handles are transitioned from the closed position to the open position, the handles of the multipurpose tool also generally house one or more tool members. By storing the tool members within the handles when the tool members are not in use, the form factor of the multipurpose tool may be relatively small in comparison to the number of tool members carried by the multipurpose tool. Thus, the multipurpose tool may have substantial utility and versatility, albeit in a relatively small tool. To access a tool member that is stored within a handle, a user may engage the tool member, such as with their fingernail, and may unfold the tool member such that the tool member is operational.

BRIEF SUMMARY

A tool, such as a multipurpose tool, is provided in accordance with an example embodiment in order to facilitate utilization of the tool by users in a wide variety of applications. For example, the multipurpose tool of an example embodiment is configured to apply bias forces to the jaws during relative rotation between the jaws and the handles, thereby providing for controlled movement of the handles between closed and open positions. Additionally, the bias forces applied to the jaws provide for infinite positioning of the jaws relative to the handles between the open and closed positions.

An example embodiment of a multipurpose tool provided herein includes: first and second handles configured for relative movement between a closed position and an open position, where the first handle includes a first axle extending thereacross, the second handle including a second axle extending thereacross, and where the first handle includes a first cam surface with the second handle having a second cam surface; first and second jaws rotatably connected to the first and second handles, respectively, where the first jaw defines an opening through which the first axle extends, where the second jaw defines an opening through which the second axle extends; third and fourth jaws rotatably connected to the second and first handles, respectively, where the third jaw defines an opening through which the second axle extends and the fourth jaw defines an opening through which the first axle extends; first and second cam followers attached to the first and second jaws, respectively, where the first and second cam followers follow along the second and first cam surfaces, respectively, as the first and second handles move between the closed position and the open position; third and fourth cam elements fixedly attached to the third and fourth jaws, respectively, where the third and fourth cam elements rotate relative to the second and first cam followers as the third and fourth jaws rotate from a stowed position within the second handle and first handle, respectively, to a deployed position, where the third and fourth cam elements bias the third and fourth jaws into engagement with the first and second jaws respectively in response to the third and fourth jaws being in the deployed position.

According to an example embodiment, the third and fourth jaws each define a cavity, where the first and second jaws are received into the cavity of the third and fourth jaw, respectively, when the first and second jaws are in the deployed position and the third and fourth jaws are in the deployed position. According to certain embodiments, the first jaw is attached to the second handle through the second axle, where the third jaw is attached to the second handle through the second axle, and where the first jaw is received into the cavity of the third jaw. The second jaw of an example embodiment is attached to the first handle through the first axle, where the fourth jaw is attached to the first handle through the first axle, where the second jaw is received into the cavity of the fourth jaw.

According to certain embodiments, the third and fourth jaws each define a cavity including a flange extending to a respective tip of the third and fourth jaws, where the first and second jaws are received into the cavity of the third and fourth jaw, respectively, when the first jaw and the second jaw are in at least a partially opened orientation relative to one another. A tip of the first jaw and a tip of the second jaw each engage a flange of the third jaw and the fourth jaw, respectively, when the first jaw and the second jaw are closed together. The third jaw and fourth jaw, in the deployed position of some embodiments, are configured to transmit pressure from the first and second jaws to the third and fourth jaw. According to some embodiments, the pressure between the first jaw and the second jaw is transmitted between the third and fourth jaw through the flanges of the first jaw and the second jaw. According to certain embodiments, in the deployed position, tips of the first jaw and the second jaws extend a first distance from a pivot point between the first jaw and the second jaw, where in the deployed position, tips of the third jaw and the fourth jaw extend a second distance from the pivot point between the first jaw and the second jaw, where the second distance is greater than the first distance.

Embodiments provided herein include a multipurpose tool including: a first handle and a second handle, the first handle having a first axle and the second handle having a second axle; a first jaw and a second jaw, the first jaw and the second jaw defining a stowed position and a deployed position, where in the stowed position the first jaw is received within the second handle and the second jaw is received within the first handle; a third jaw and a fourth jaw, the third jaw and the fourth jaw defining a stowed position and a deployed position, where in the stowed position the third jaw is received within the second handle and the fourth jaw is received within the first handle, where the first jaw is pivotably attached to the second handle at the second axle, the second jaw is pivotably attached to the first handle at the first axle, the third jaw is pivotably attached to the second handle at the second axle, and the fourth jaw is pivotably attached to the first handle at the first axle.

According to some embodiments, the first jaw and the second jaw, in the deployed position, engage one another between an open position and a closed position, where in the closed position, a first tip of the first jaw engages a second tip of the second jaw. According to certain embodiments, the third jaw and the fourth jaw in the deployed position engage the first jaw and the second jaw respectively. The multipurpose tool of some embodiments further includes: a cam follower attached to the first jaw and a second cam follower attached to the second jaw, where the first cam follower follows a cam surface of the second handle in response to the first jaw moving from the stowed position to the deployed position, and where the second cam follower follows a cam surface of the first handle in response to the second jaw moving from the stowed position to the deployed position.

According to some embodiments, the first cam follower engages a detent in the second handle in response to reaching the deployed position, where the second cam follower engages a detent in the first handle in response to reaching the deployed position, and where in the deployed position, the first handle is frictionally engaged with the second jaw and the second handle is frictionally engaged with the first jaw. The multipurpose tool of an example embodiment further includes: a third cam attached to the third jaw and a fourth cam attached to the fourth jaw, where the third cam rotates relative to the second cam follower in response to the third jaw moving from the stowed position to the deployed position, and where the fourth cam rotates relative to the first cam follower in response to the fourth jaw moving from the stowed position to the deployed position.

According to certain embodiments, the third cam biases the second axle against a second resilient member in response to the third jaw rotating past a second predefined rotation relative to the second handle, where the fourth cam biases the first axle against a first resilient member in response to the fourth jaw rotating past a first predefined rotation relative to the first handle, where rotation of the third jaw past the second predefined rotation engages a drive surface of the third cam with the second cam follower and rotation of the fourth jaw past the first predefined rotation engages a drive surface of the fourth cam with the first cam follower. The second cam follower of an example embodiment acts on the drive surface of the third cam to bias the third jaw into engagement with the first jaw, and where the first cam follower acts on the fourth cam to bias the fourth jaw into engagement with the second jaw.

Embodiments provided herein include a method of operating a multipurpose tool having two pairs of jaws including: rotating a first handle relative to a second jaw to an open position; rotating a second handle relative to a first jaw to the open position; rotating a third aw relative to the second handle to engage the first jaw to a deployed position; biasing the third jaw toward the first jaw in response to the third jaw being in the deployed position; rotating a fourth jaw relative to the first handle to engage the second jaw to the deployed position; and biasing the fourth jaw toward the second jaw in response to the fourth jaw being in the deployed position, where the first jaw and fourth jaw rotate about a first axis defined within the first handle, where the second jaw and the third jaw rotate about a second axis defined within the second handle. Biasing the third jaw toward the first jaw in response to the third jaw being in the deployed position includes, in some embodiments, driving a drive surface of a cam of the third jaw with a cam follower of the second jaw into engagement with the first jaw. Biasing the fourth jaw toward the second jaw in response to the fourth jaw being in the deployed position includes, in some embodiments, driving a drive surface of a cam of the fourth jaw with a cam follower of the first jaw into engagement with the second jaw.

BRIEF DESCRIPTION OF THE DRAWINGS

Figure 1:
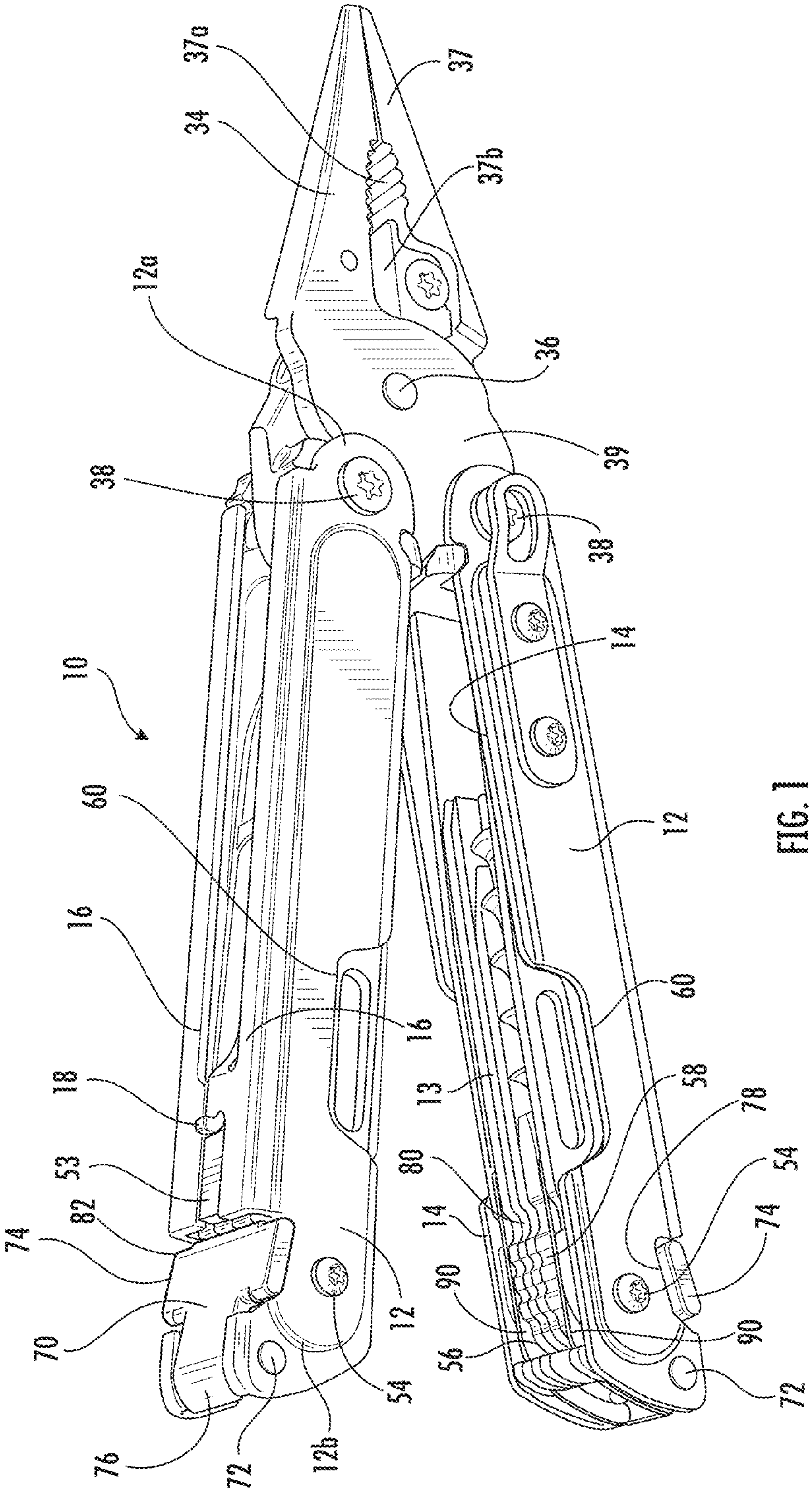
Figure 2:
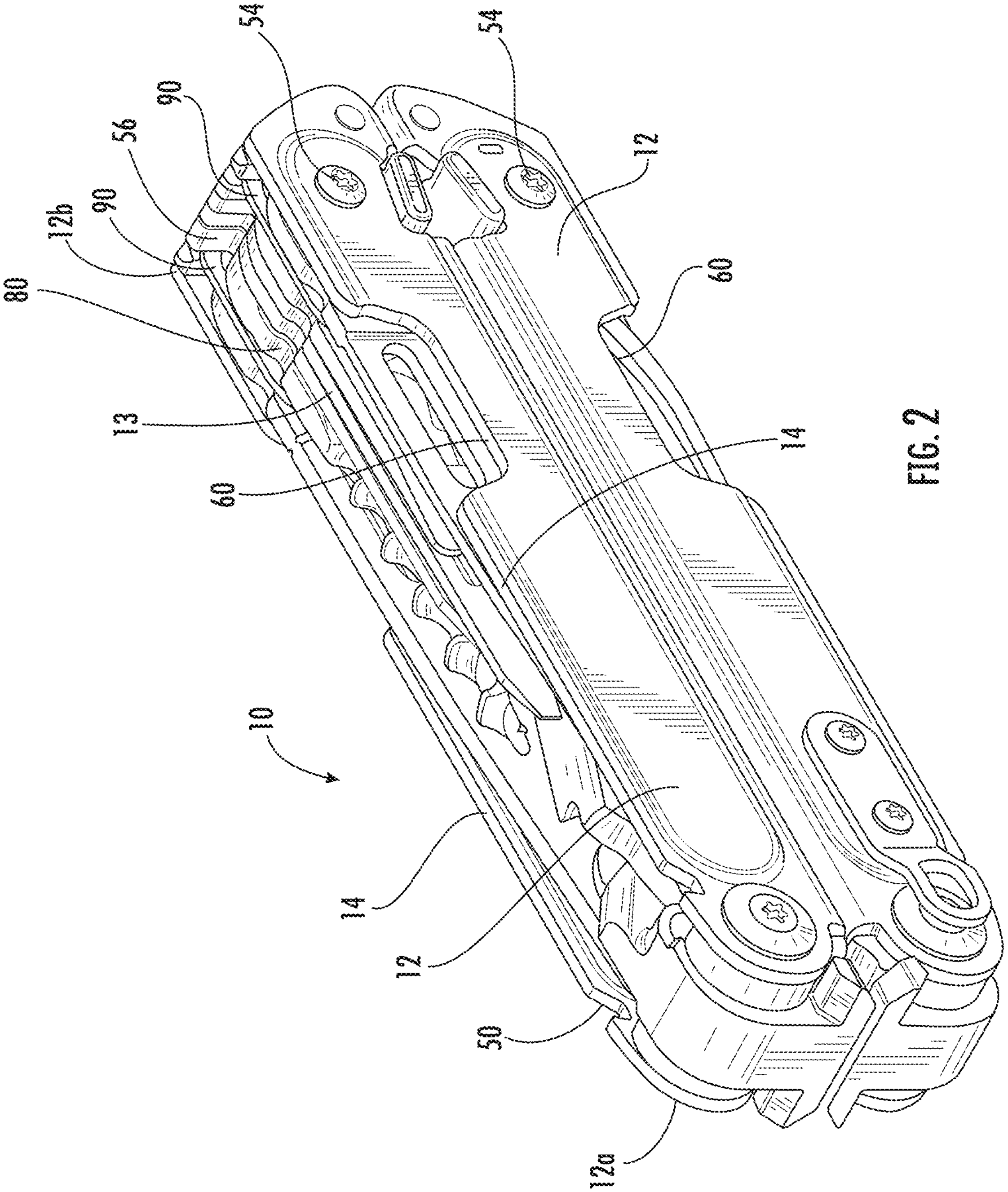
Figure 3:
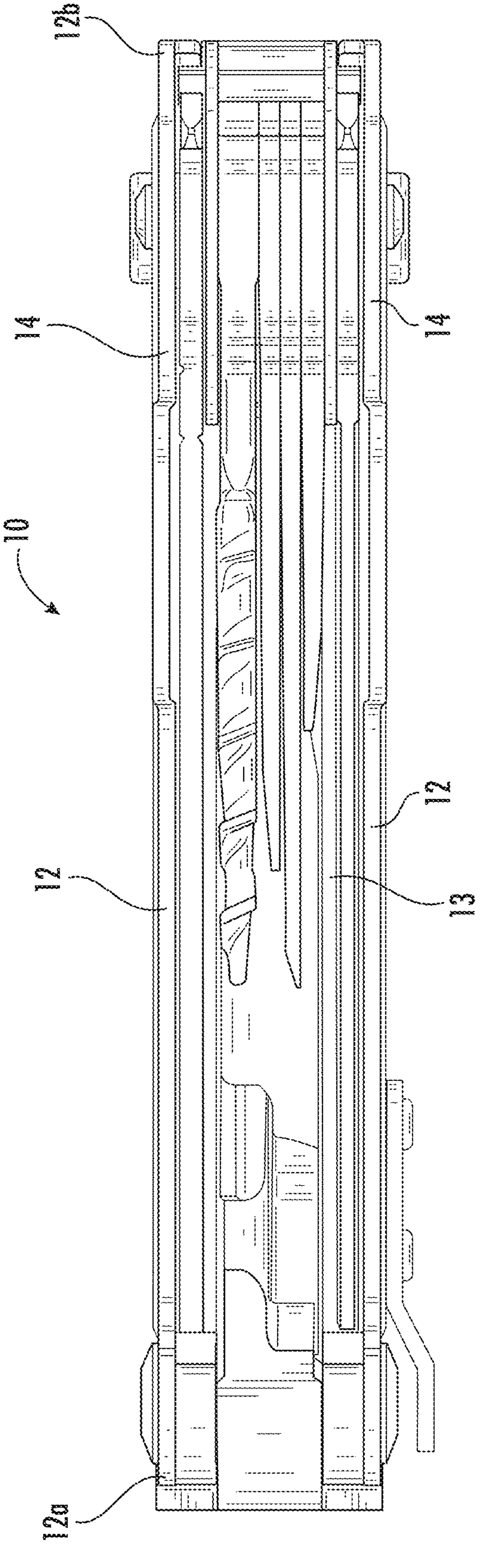
Figure 4:
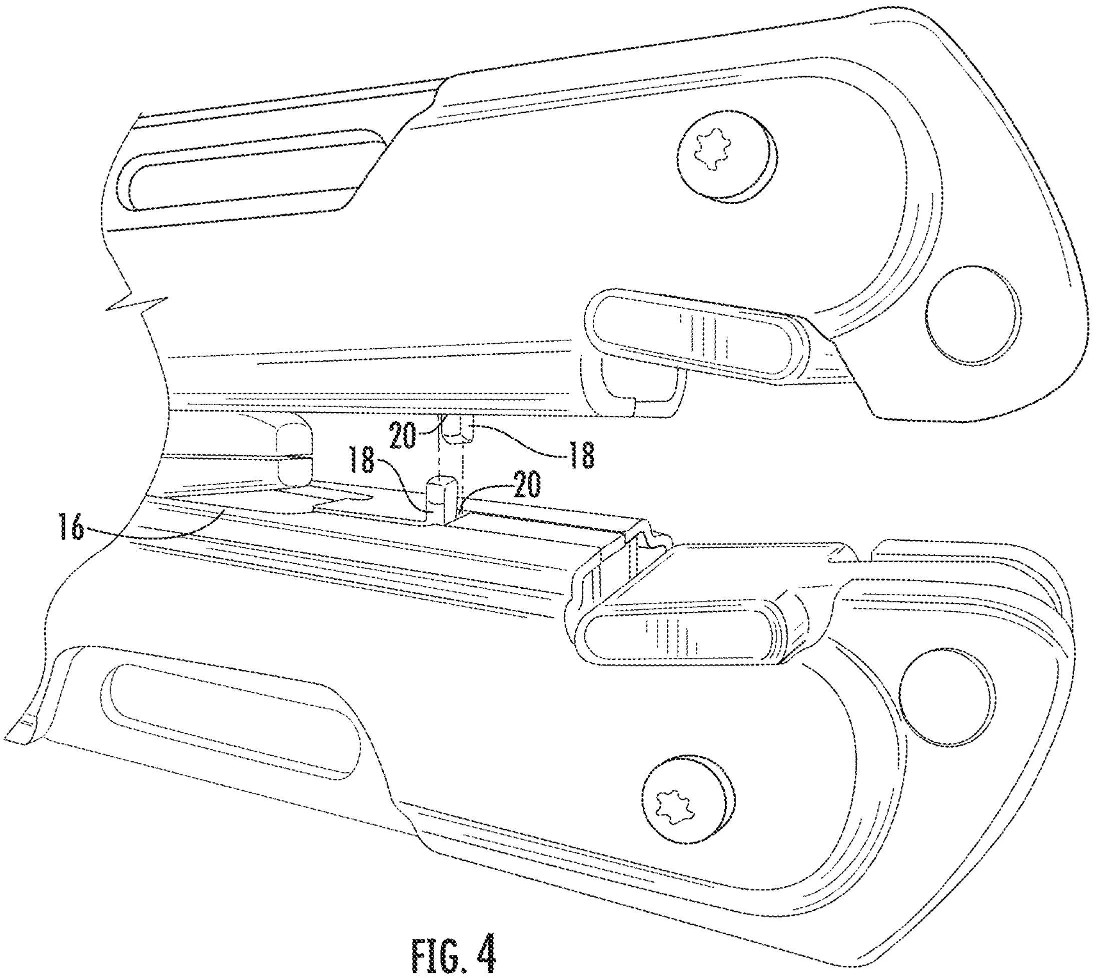
Figure 5:
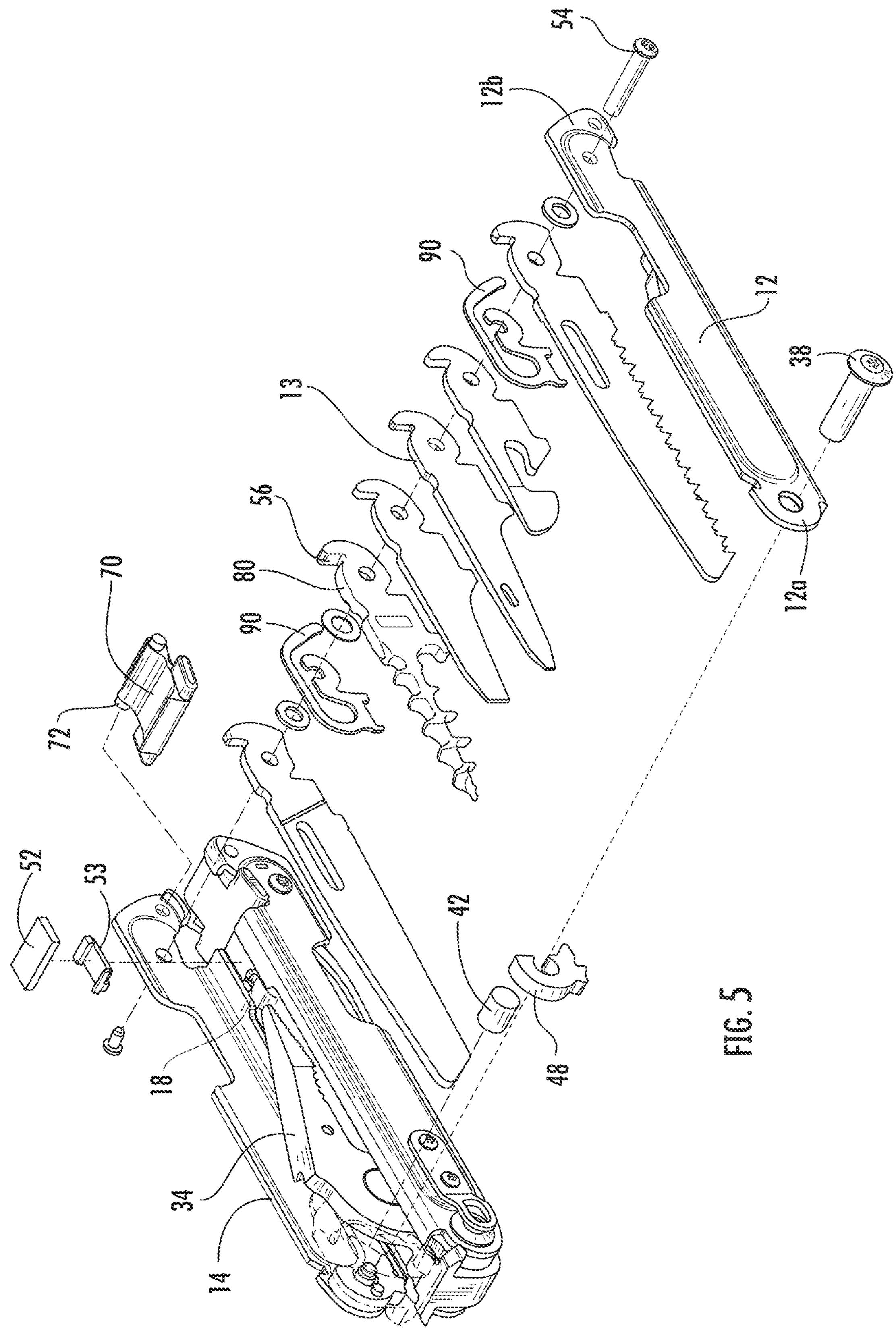
Figure 6:
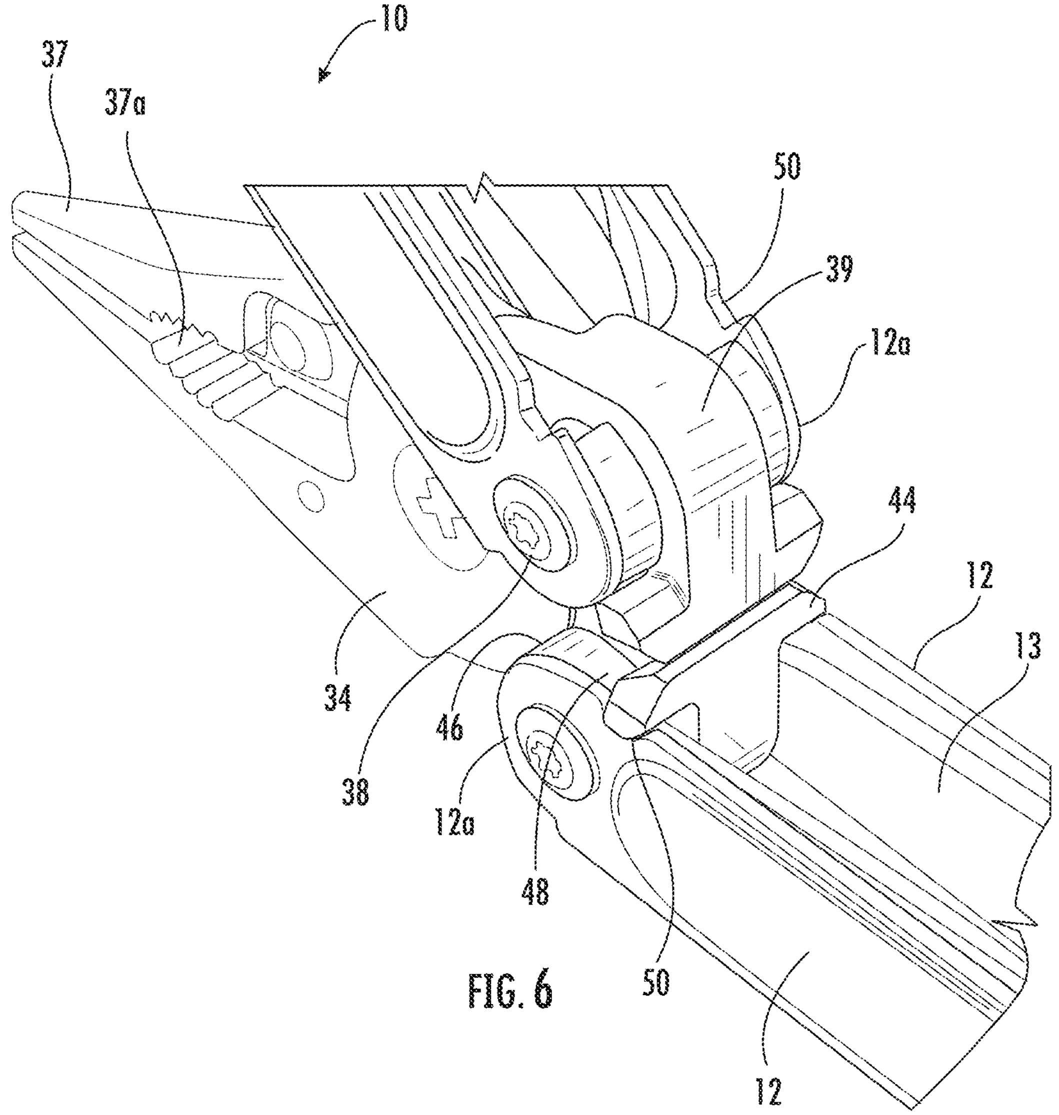
Figure 7:
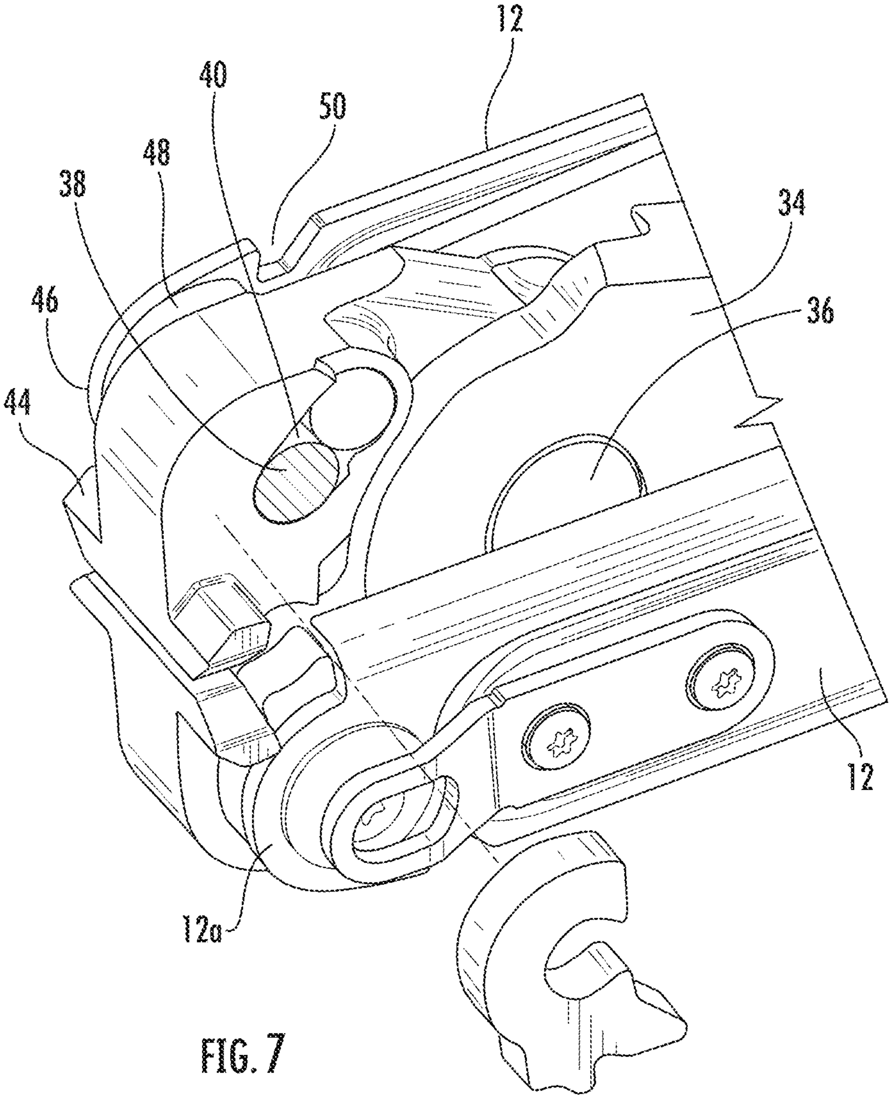
Figure 8:
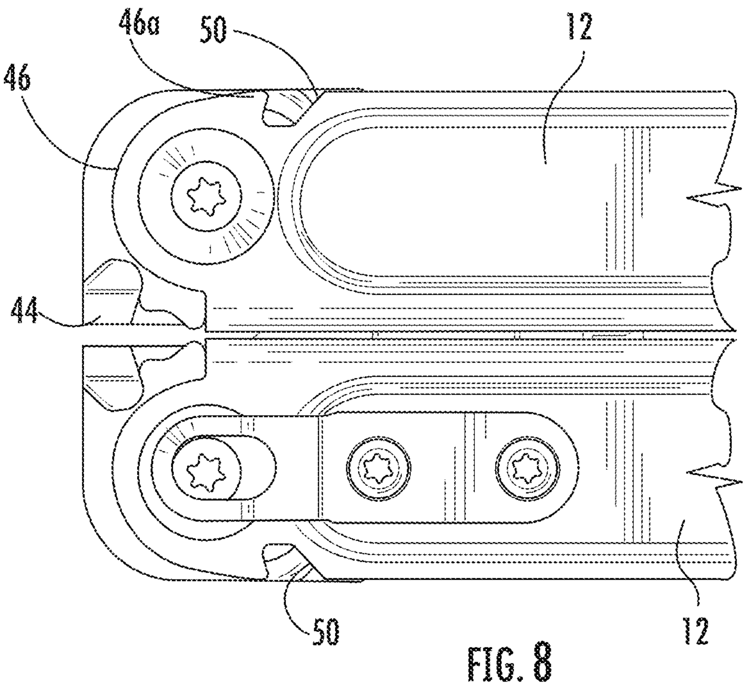
Figure 9:
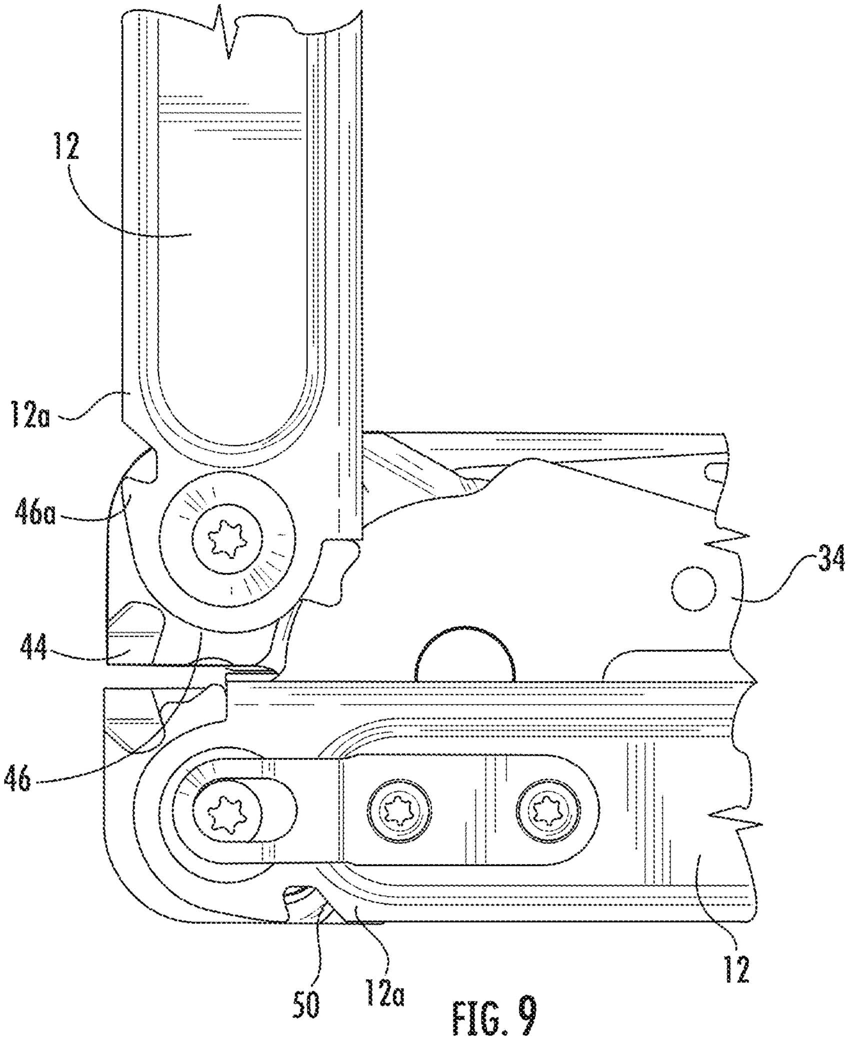
Figure 10:
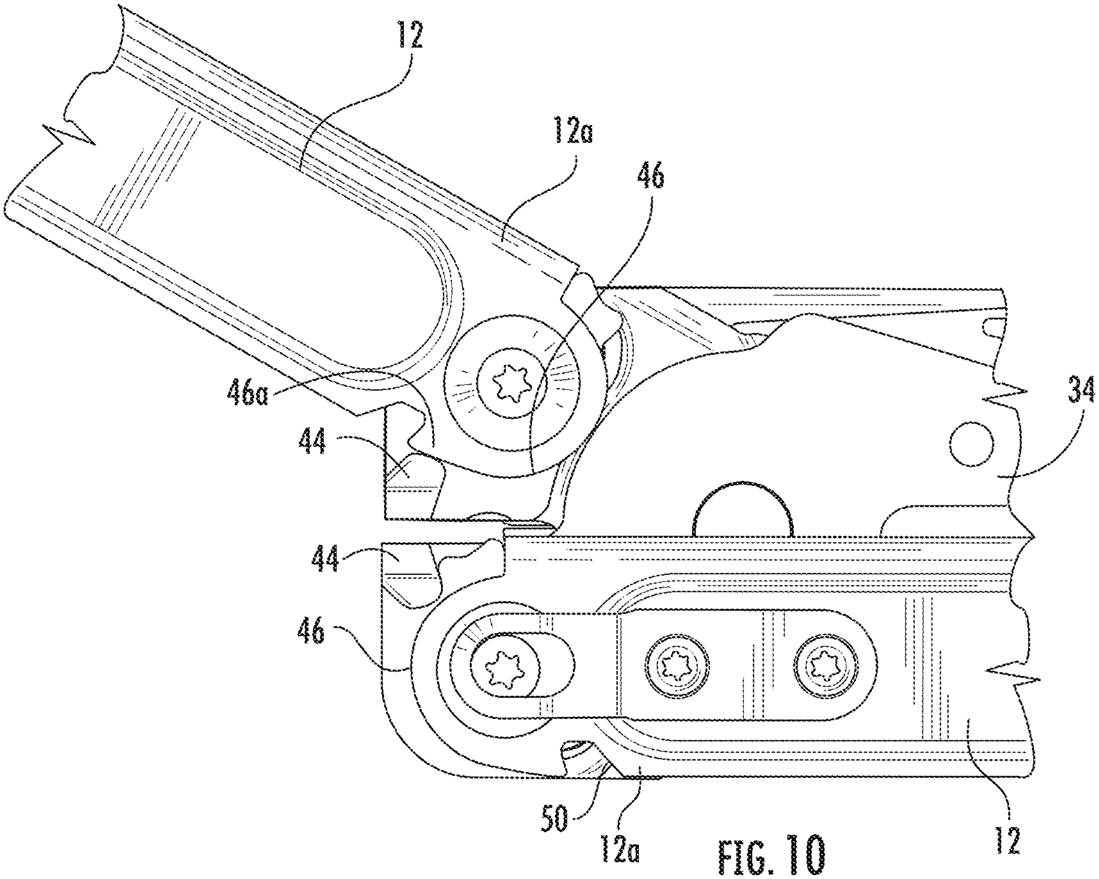
Figure 11:
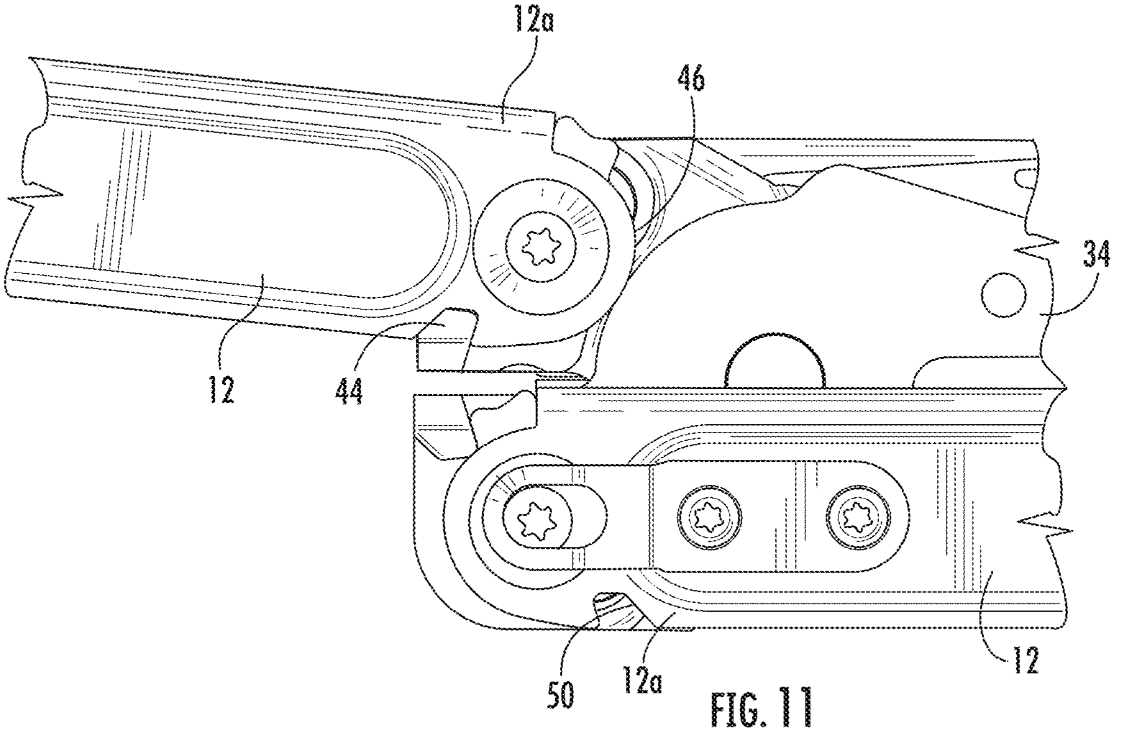
Figure 12:
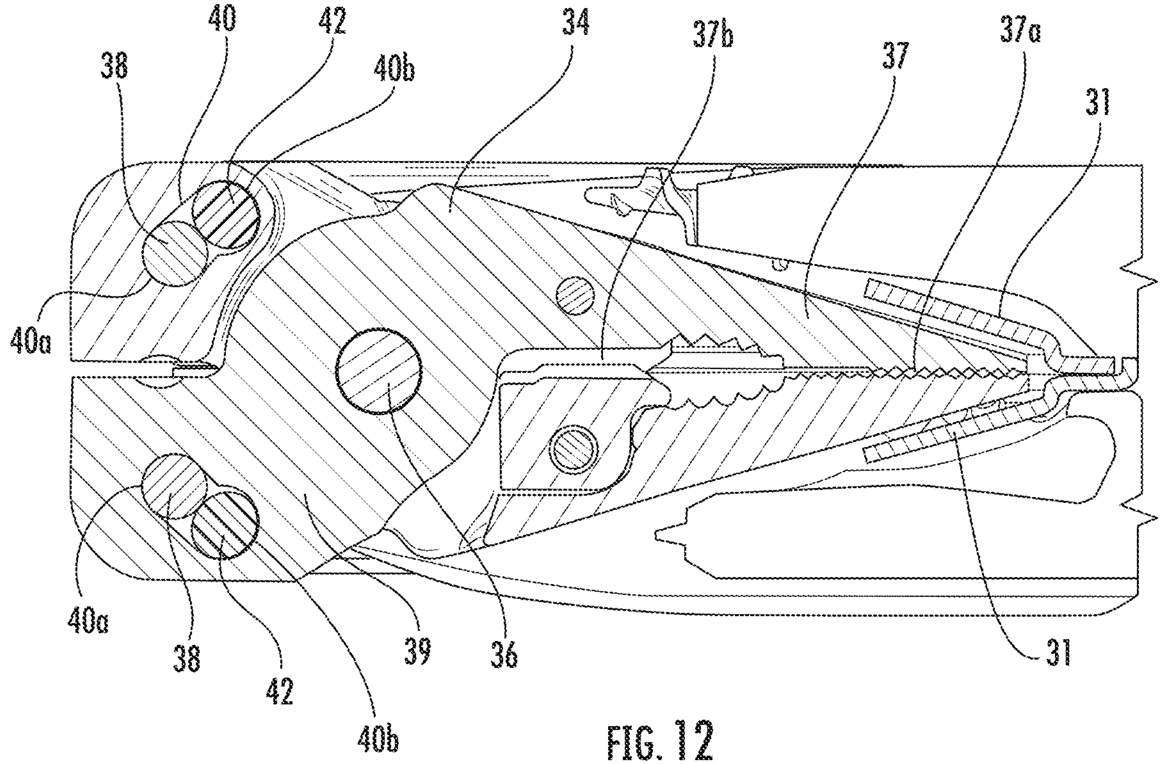
Figure 13:
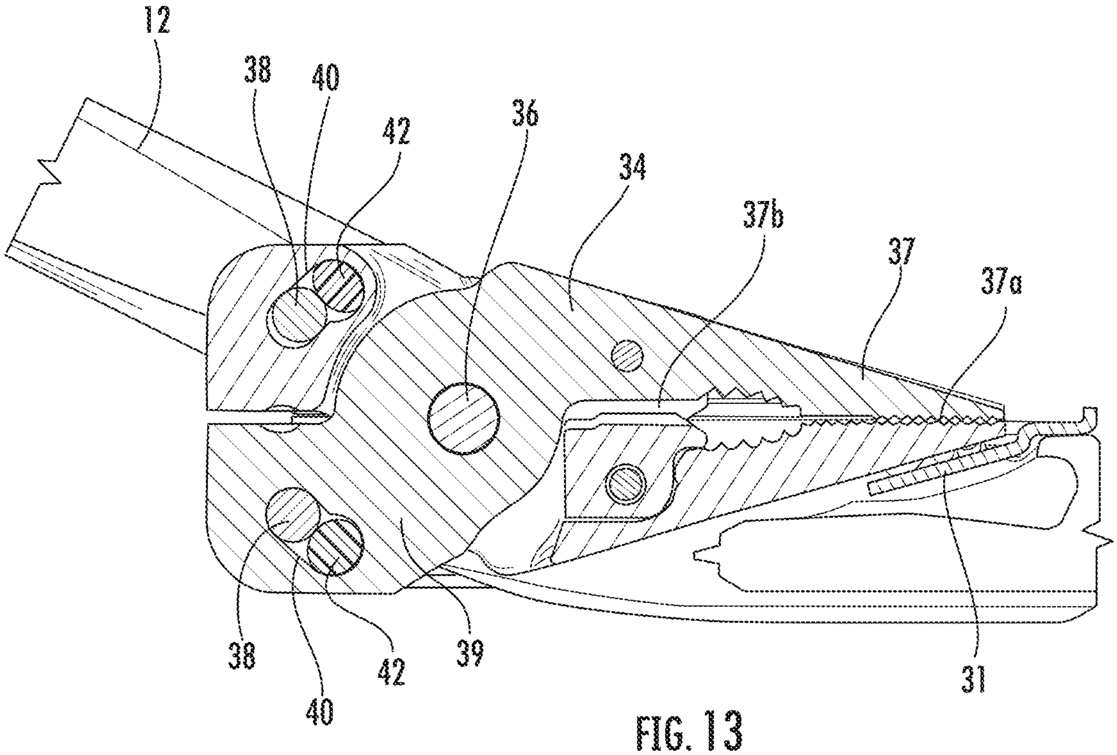
Figure 14:
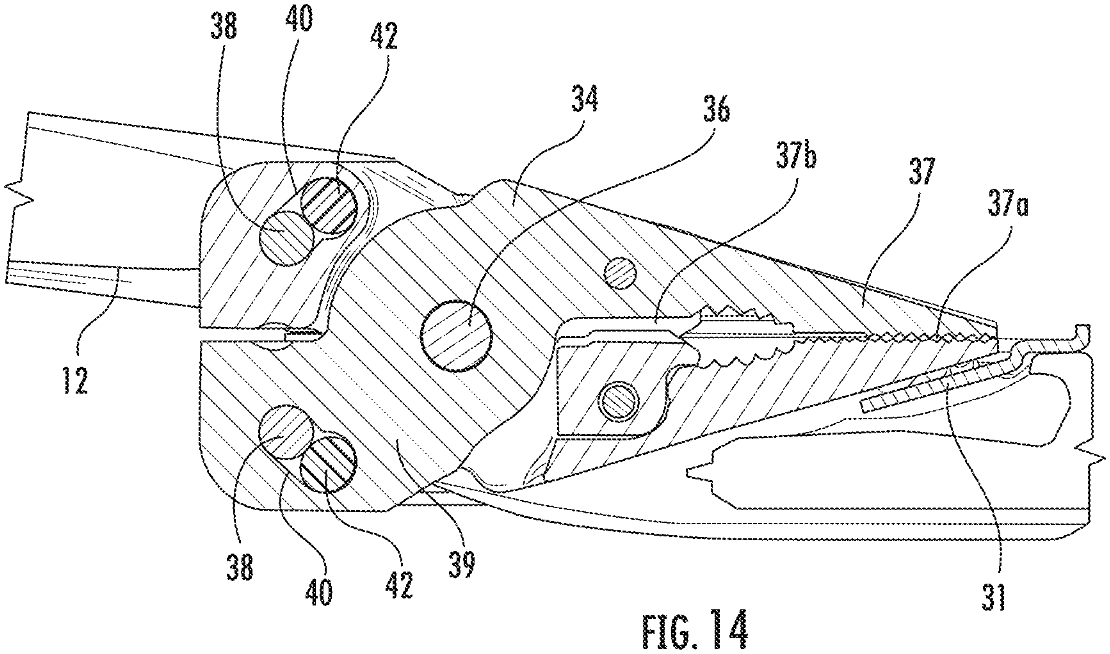
Figure 15:
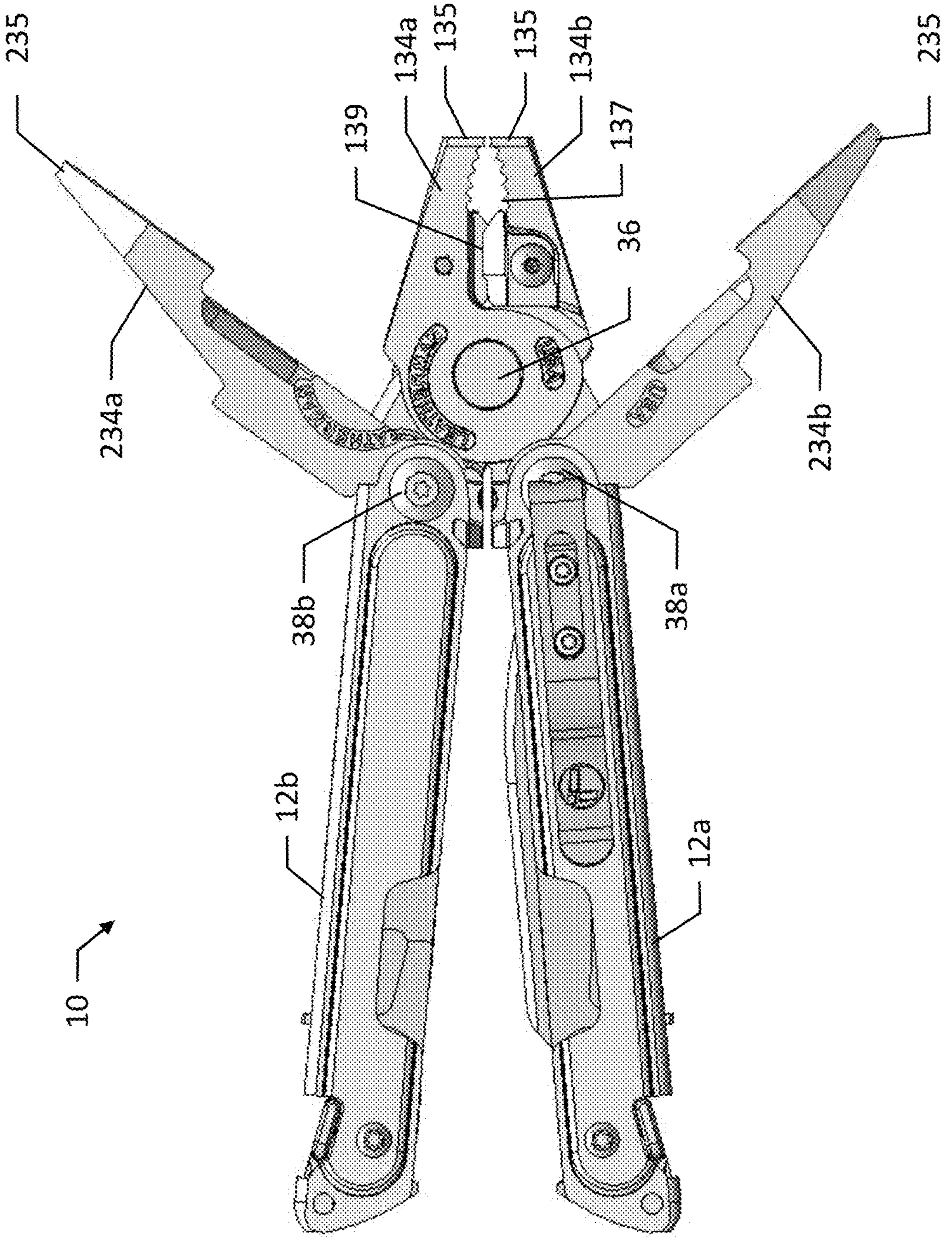
Figure 16:
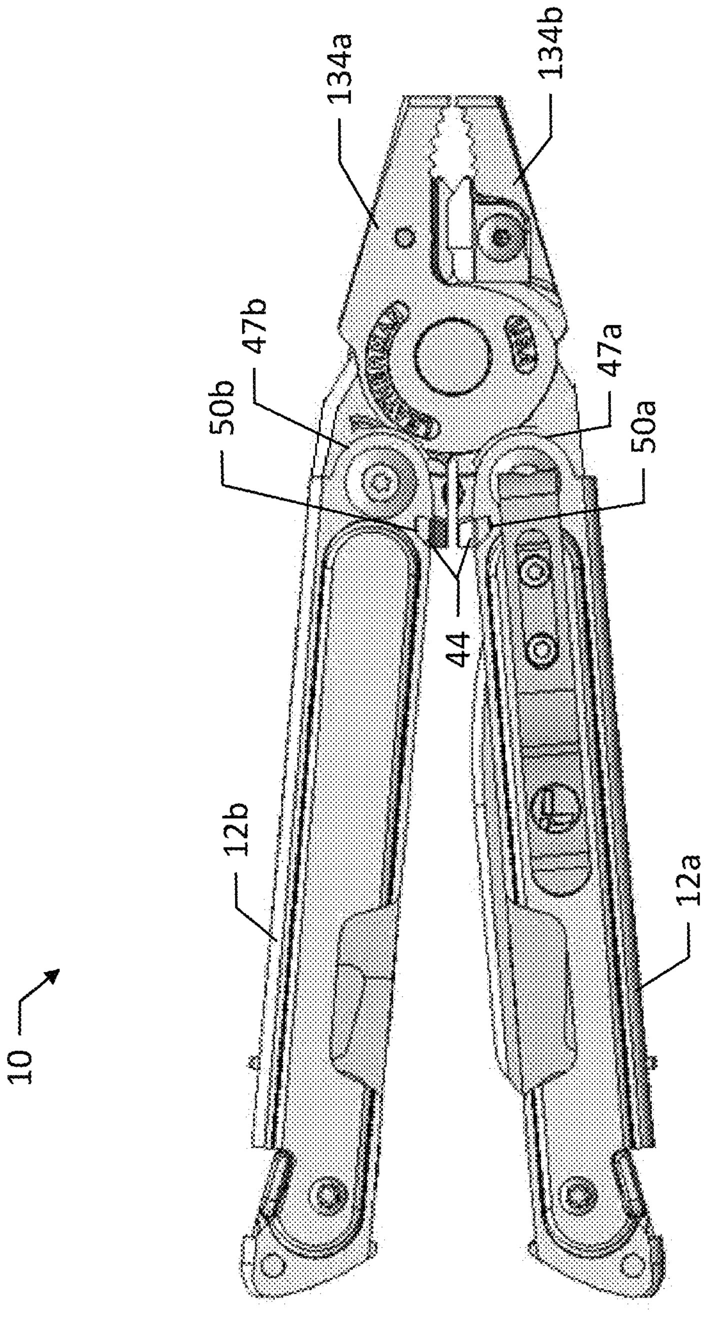
Figure 17:
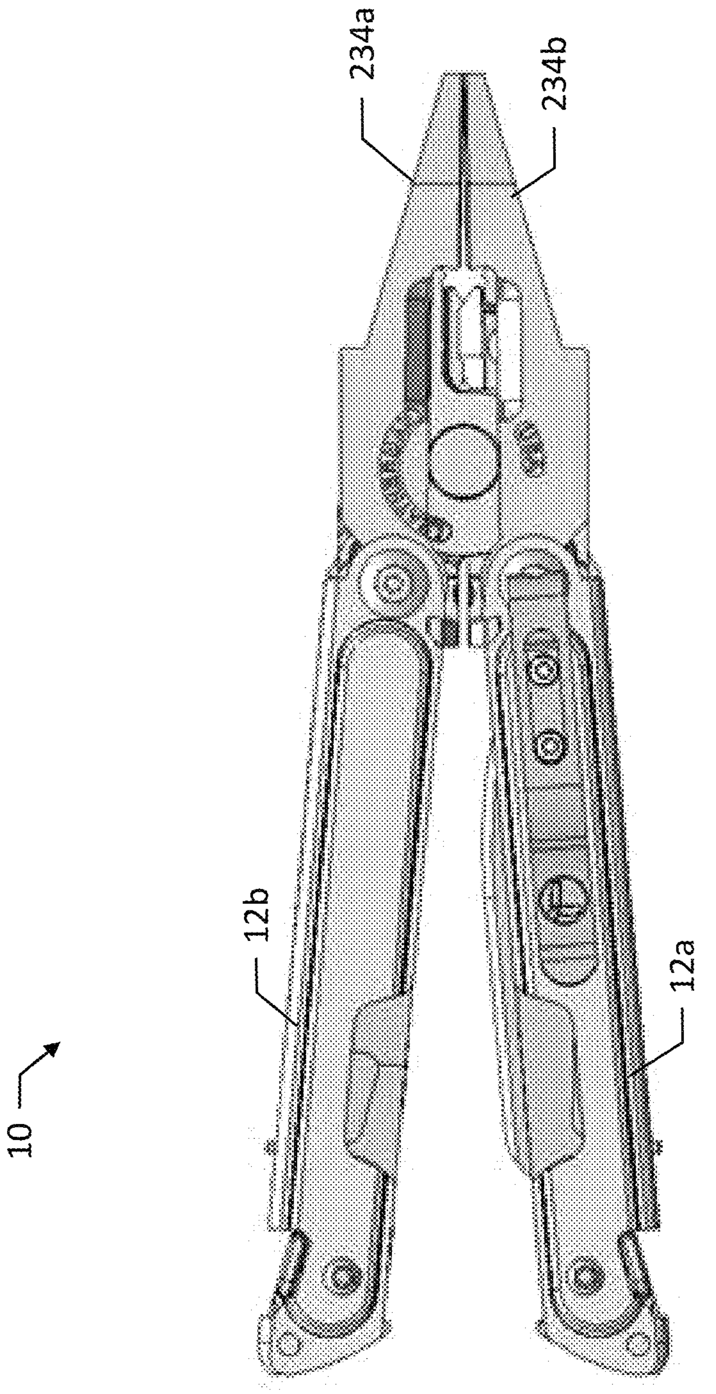
Figure 18:
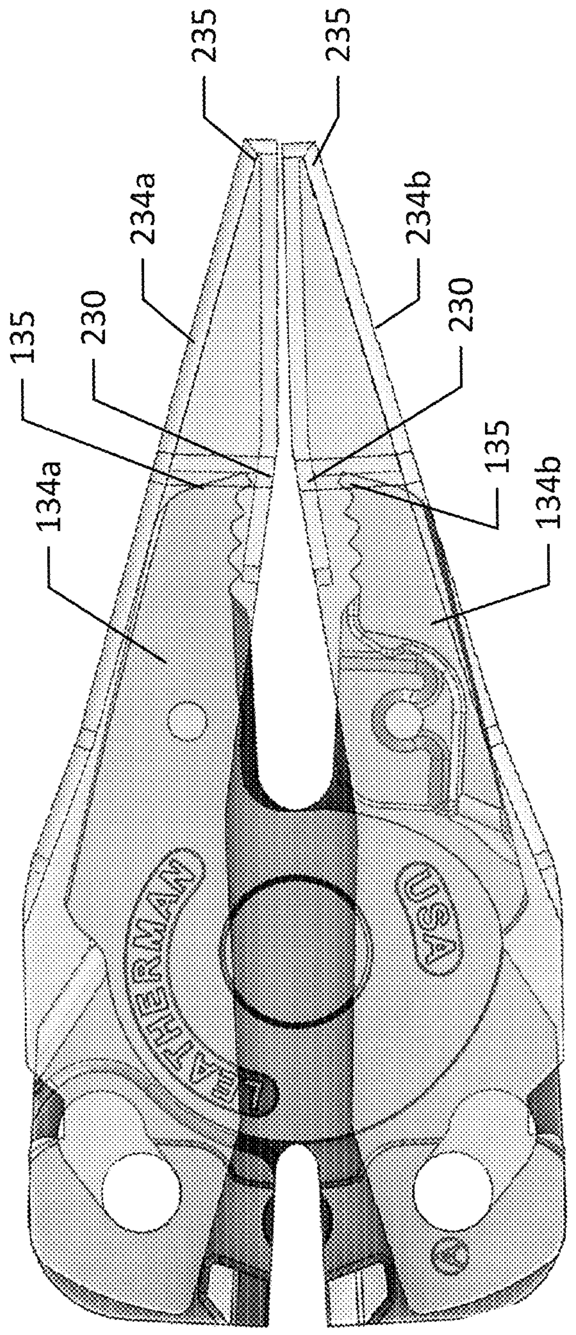
Figure 19:
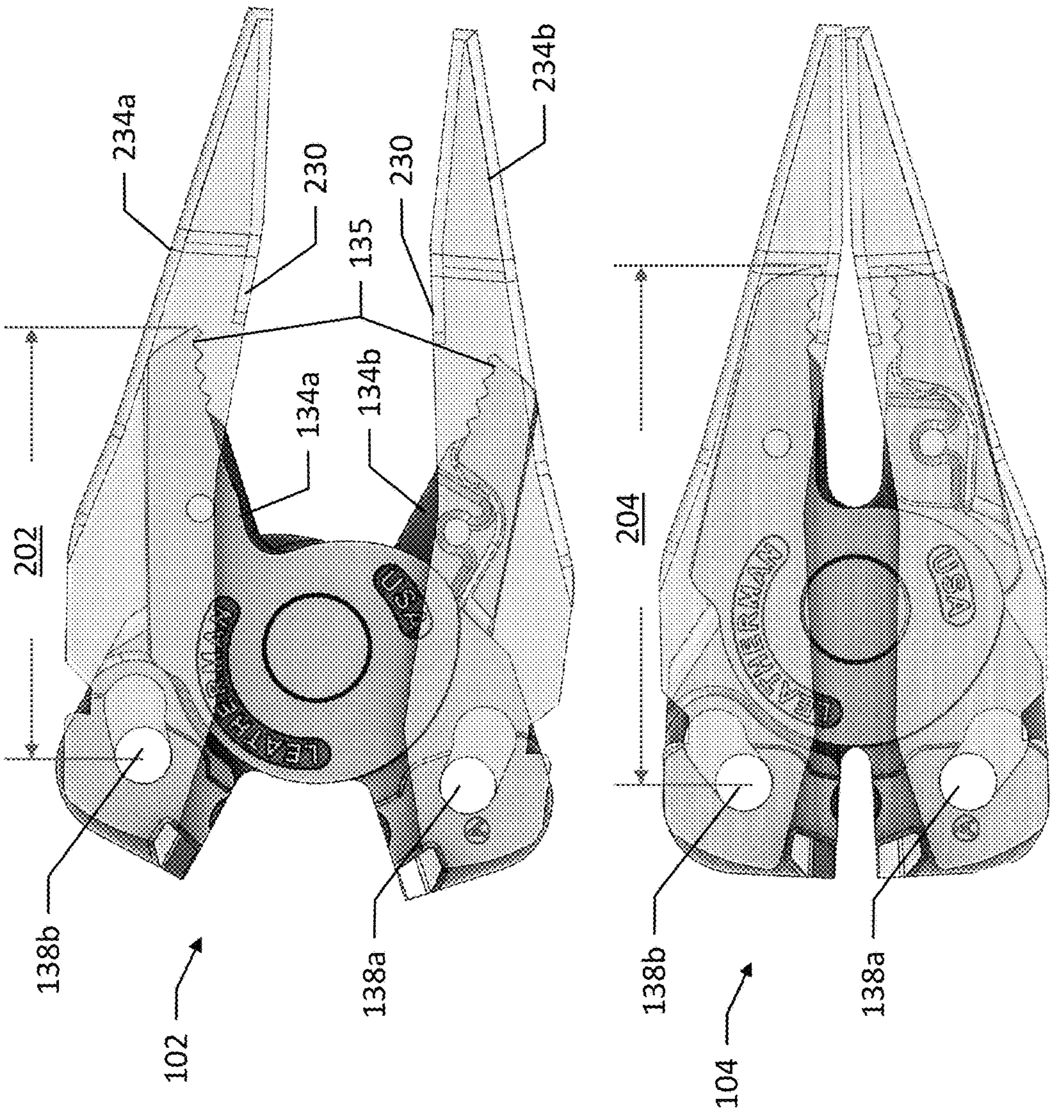
Figure 20:
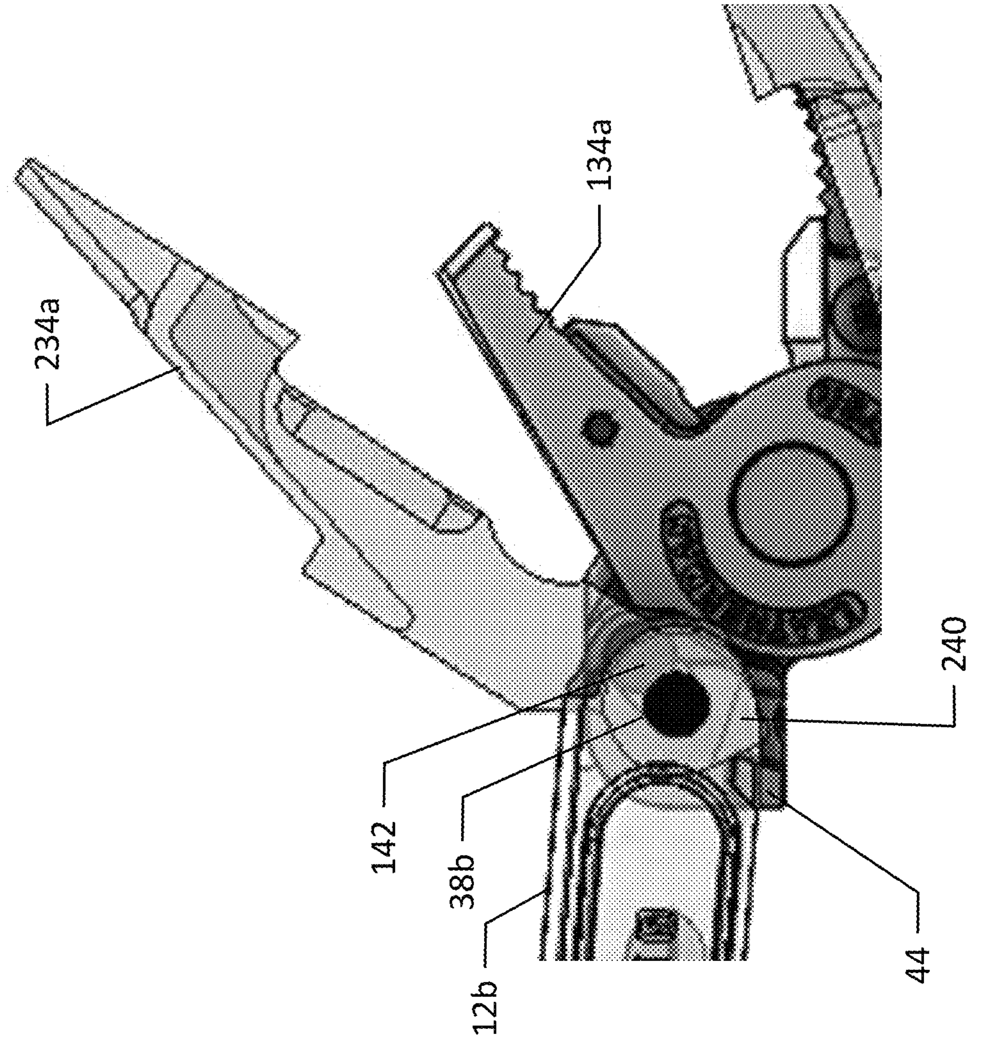
Figure 21:
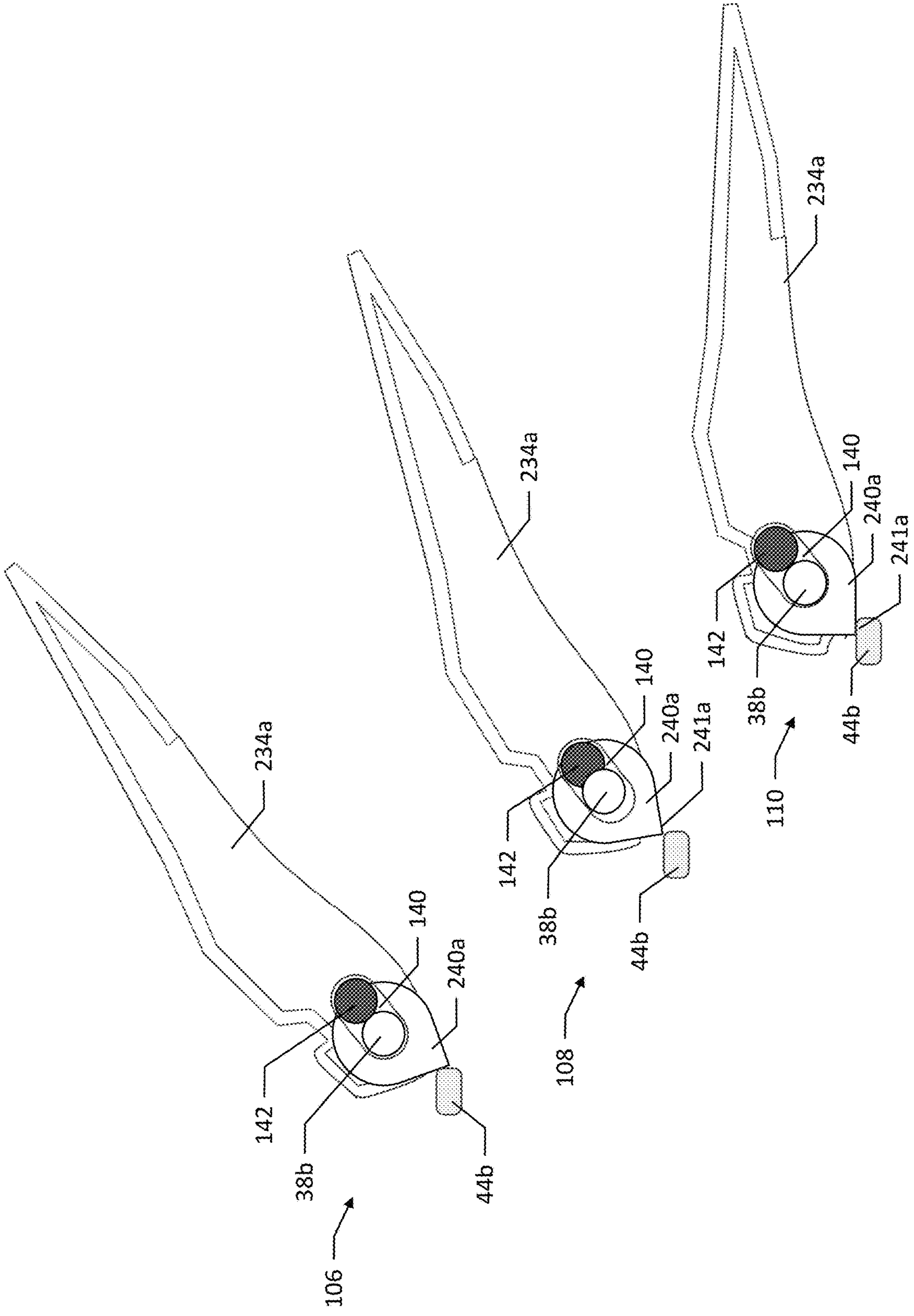
Figure 22:
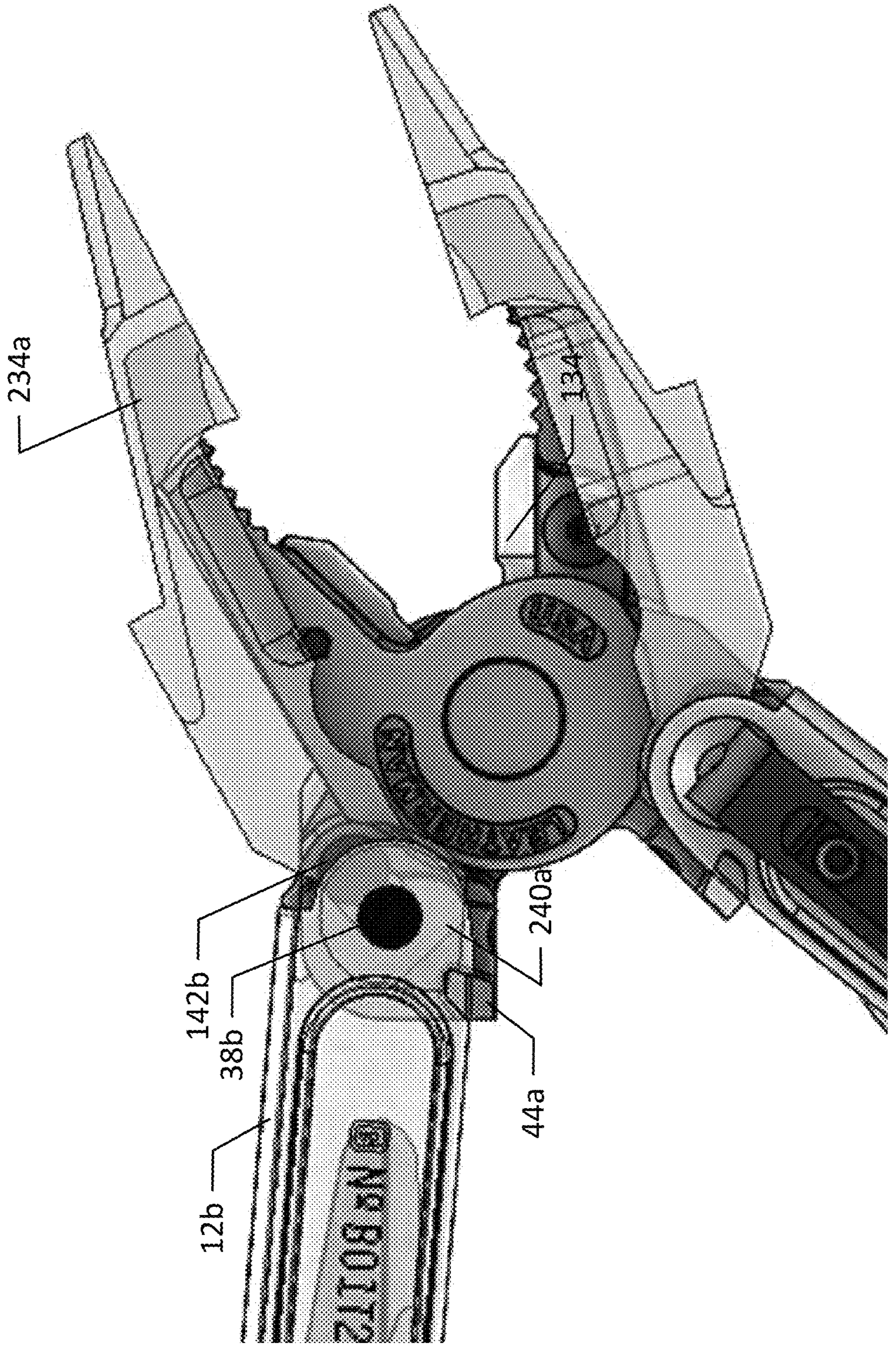

Having thus described embodiments of the invention in general terms, reference will now be made to the accompanying drawings, which are not necessarily drawn to scale, and wherein:

FIG. 1 is a perspective view of a multipurpose tool in accordance with an example embodiment of the present invention in which the multipurpose tool is in the open position;

FIG. 2 is a perspective view of a multipurpose tool in accordance with an example embodiment of the present invention in which the multipurpose tool is in the closed position;

FIG. 3 is a top view of the multipurpose tool in accordance with an example embodiment of the present invention in which the multipurpose tool is in the closed position;

FIG. 4 is a fragmentary perspective view of the multipurpose tool in accordance with an example embodiment of the present invention which depicts the interlocking relationship of the tab and hole of the first and second handles;

FIG. 5 is an exploded perspective view of a handle of the multipurpose tool in accordance with an example embodiment of the present invention;

FIG. 6 is a fragmentary perspective view of a multipurpose tool in accordance with an example embodiment of the present invention that illustrates the manner in which the cam followers of the jaws prevent at least some of the tool members from being opened while the handles are in the open position;

FIG. 7 is a fragmentary perspective view of a multipurpose tool in accordance with an example embodiment of the present invention in which the cam member has been exploded to illustrate a resilient member interacting with an axle about which a jaw rotates;

FIGS. 8-11 are sequential perspective views of a portion of a multipurpose tool in accordance with an example embodiment of the present invention that illustrate cam followers of the jaws riding upon cam surfaces of the handles during a transition between open and closed positions of the handles;

FIGS. 12-14 are cross-sectional views of a portion of a multipurpose tool in accordance with an example embodiment of the present invention that illustrate interaction of the resilient member with an axle about which the jaw rotates from the handle being in a closed position to the handle being in an open position;

FIG. 15 illustrates a multipurpose tool having two pairs of jaws according to an example embodiment of the present disclosure;

FIG. 16 illustrates the multipurpose tool having two pairs of jaws with a first pair of jaws deployed and a second pair of jaws stowed according to an example embodiment of the present disclosure;

FIG. 17 illustrates the multipurpose tool having two pairs of jaws with the first pair of jaws deployed and the second pair of jaws deployed according to an example embodiment of the present disclosure;

FIG. 18 illustrates a first pair of jaws interfacing with a second pair of jaws in the deployed position of a multipurpose tool according to an example embodiment of the present disclosure;

FIG. 19 illustrates the process of interfacing the first pair of jaws with the second pair of jaws of a multipurpose tool according to an example embodiment of the present disclosure;

FIG. 20 illustrates the process of deployment of the second pair of jaws of a multipurpose tool according to an example embodiment of the present disclosure;

FIG. 21 is a schematic illustration of the process of deployment of the second pair of jaws to interface with the first pair of jaws of a multipurpose tool according to an example embodiment of the present disclosure;

FIG. 22 illustrates the first pair of jaws engaged with the second pair of jaws with the second pair of jaws biased toward the first pair of jaws according to an example embodiment of the present disclosure.

Figure 23:
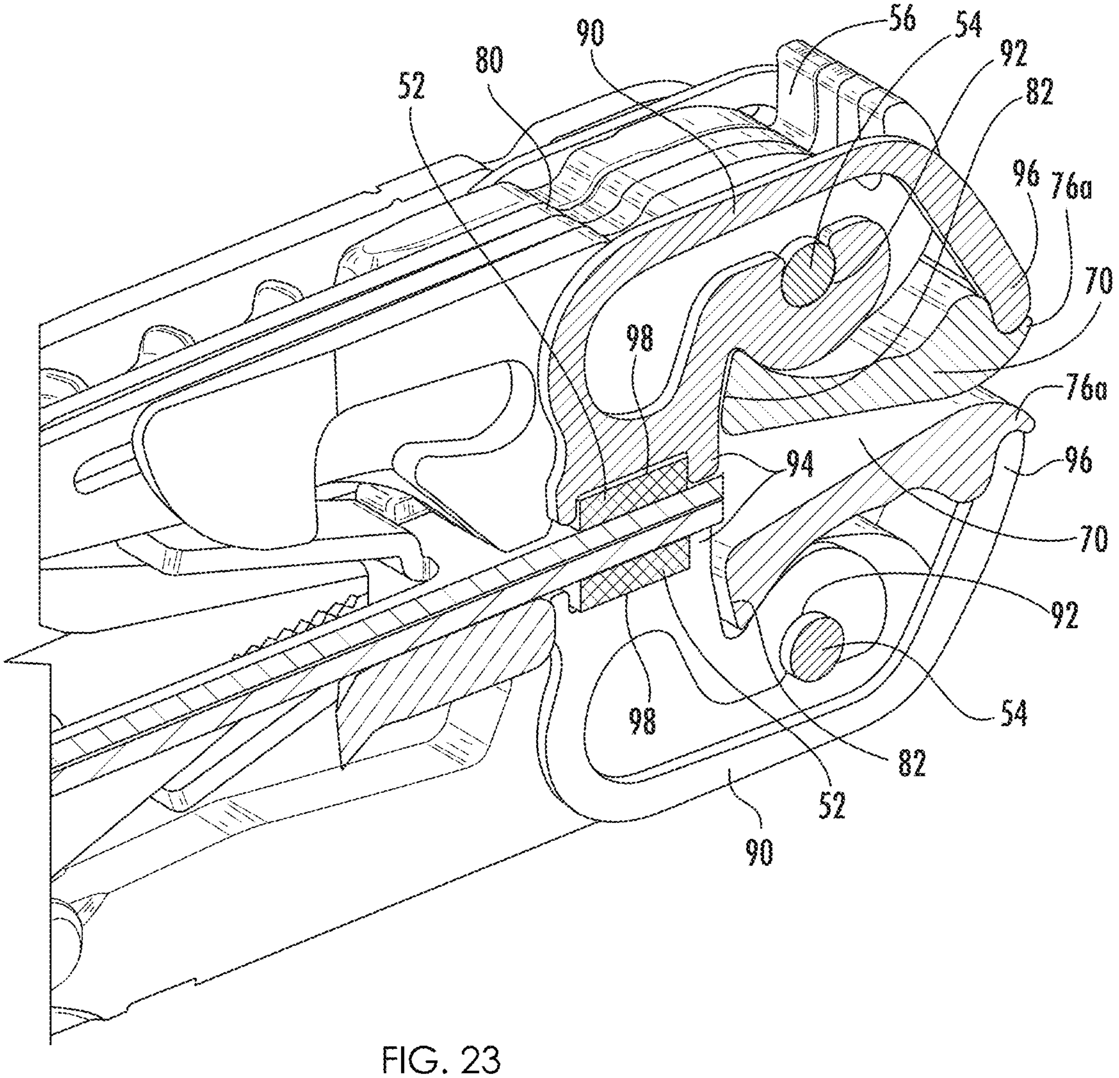
Figure 24:
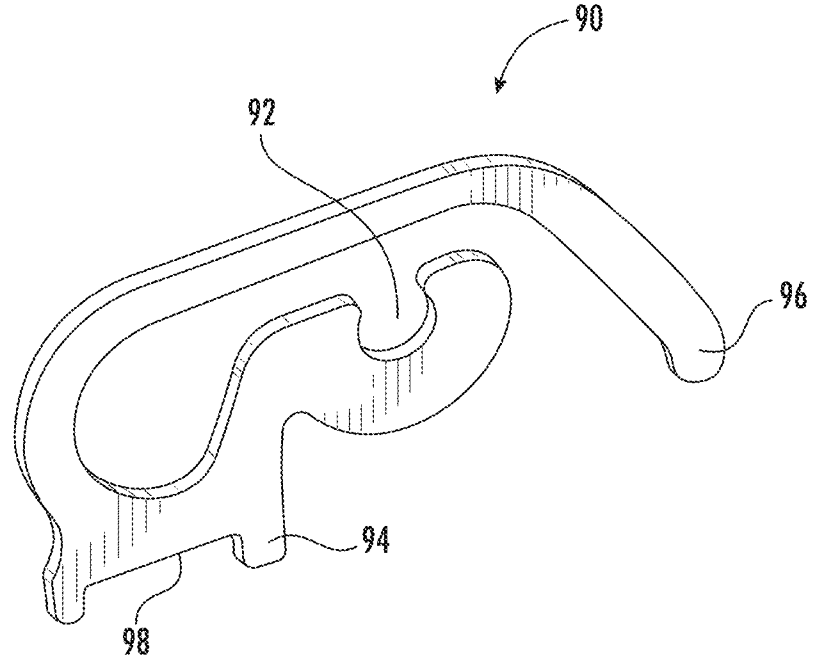
Figure 25:
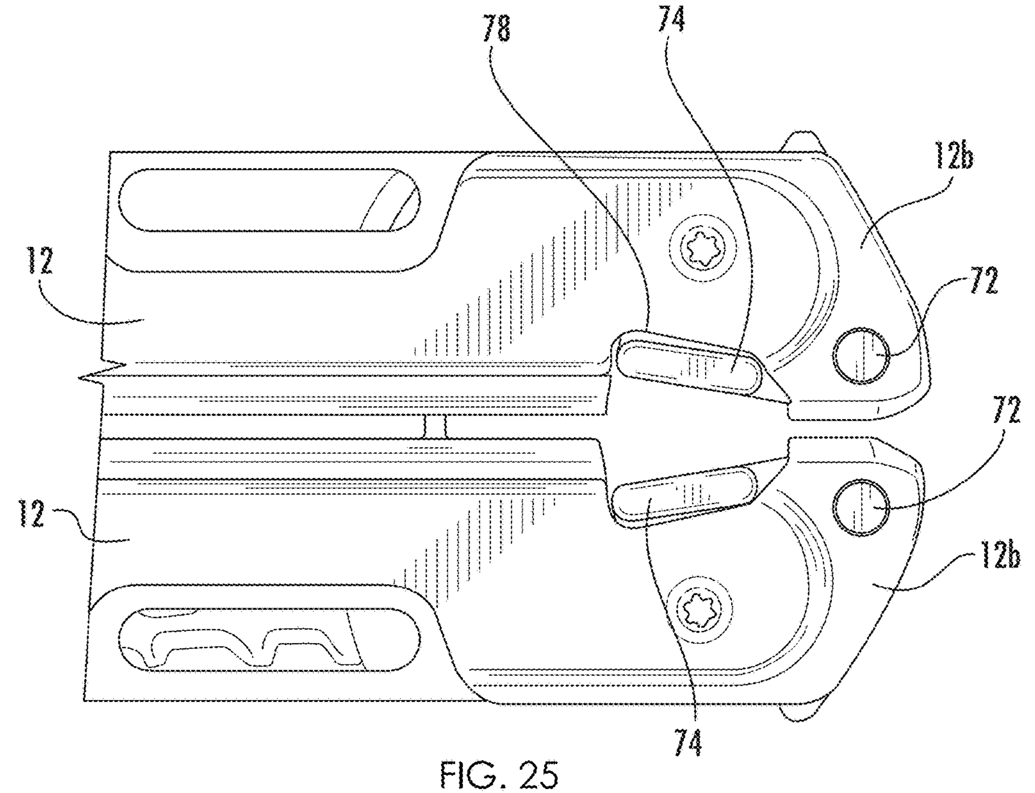
Figure 26:
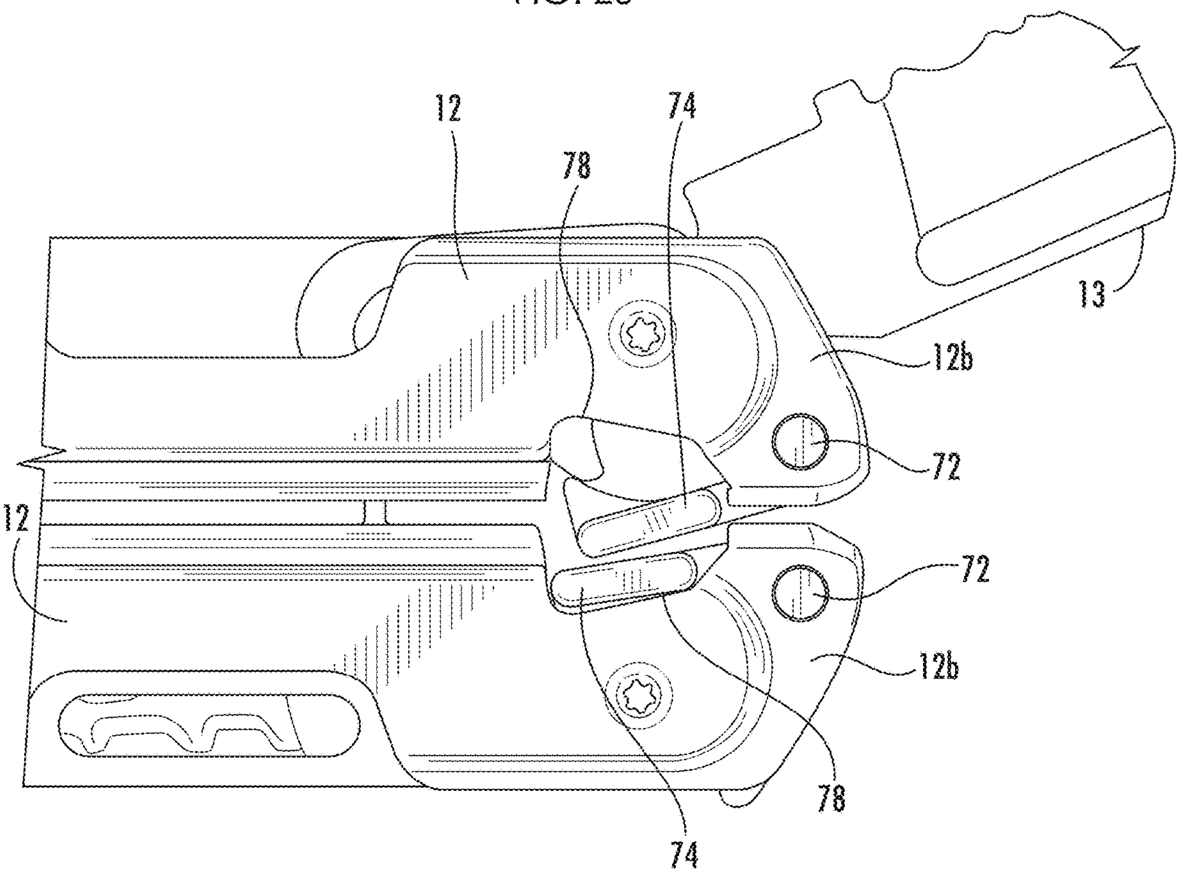
Figure 27:
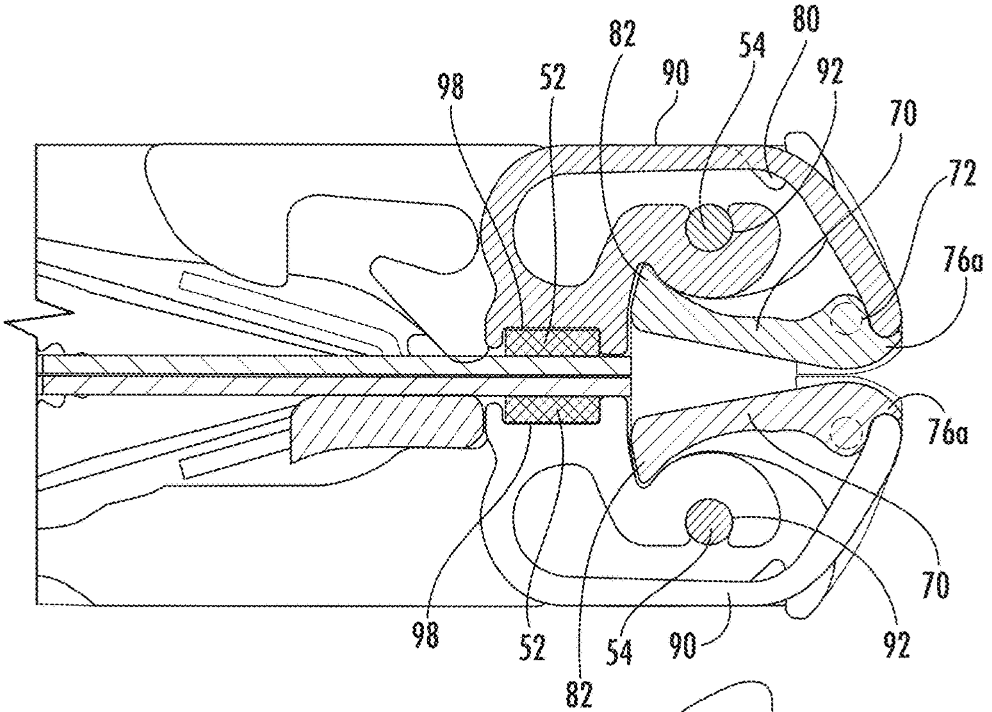
Figure 28:
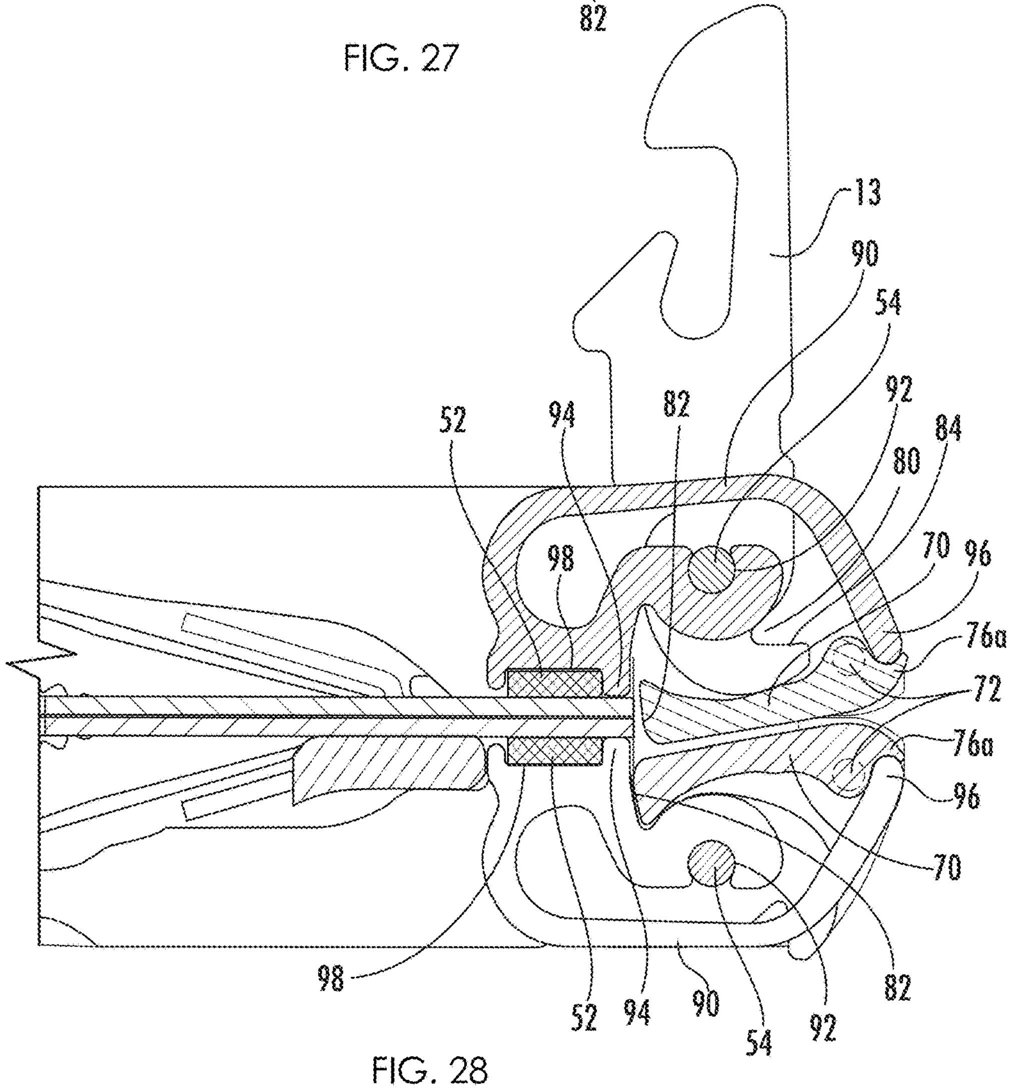
Figure 29:
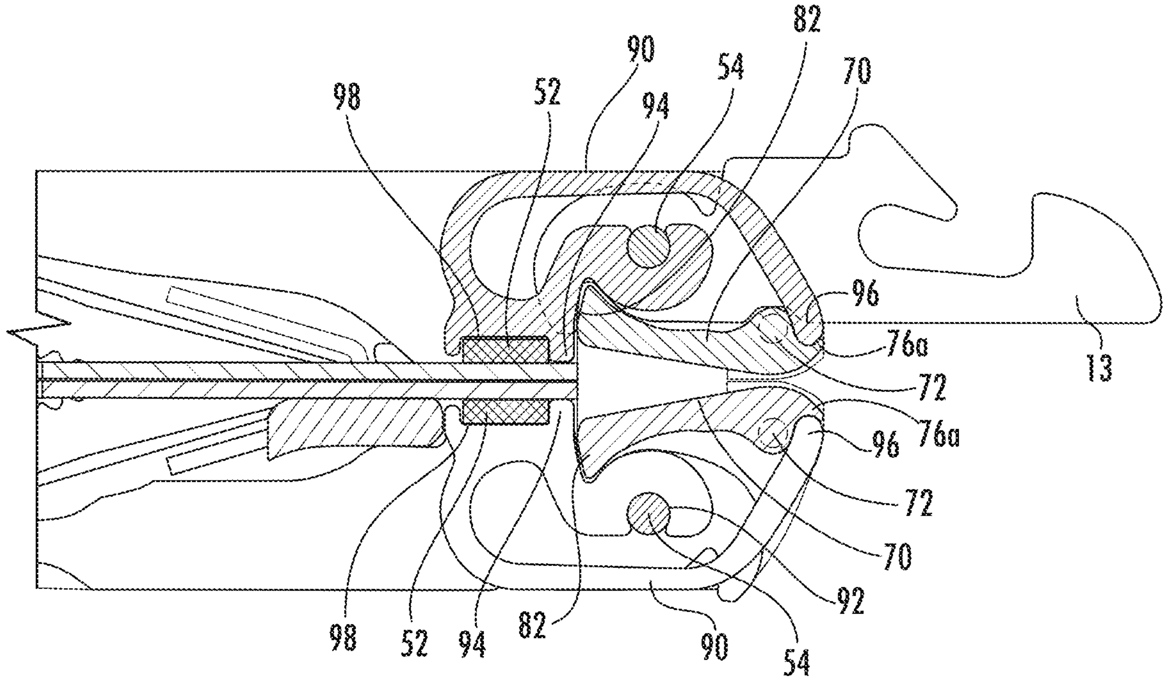
Figure 30:
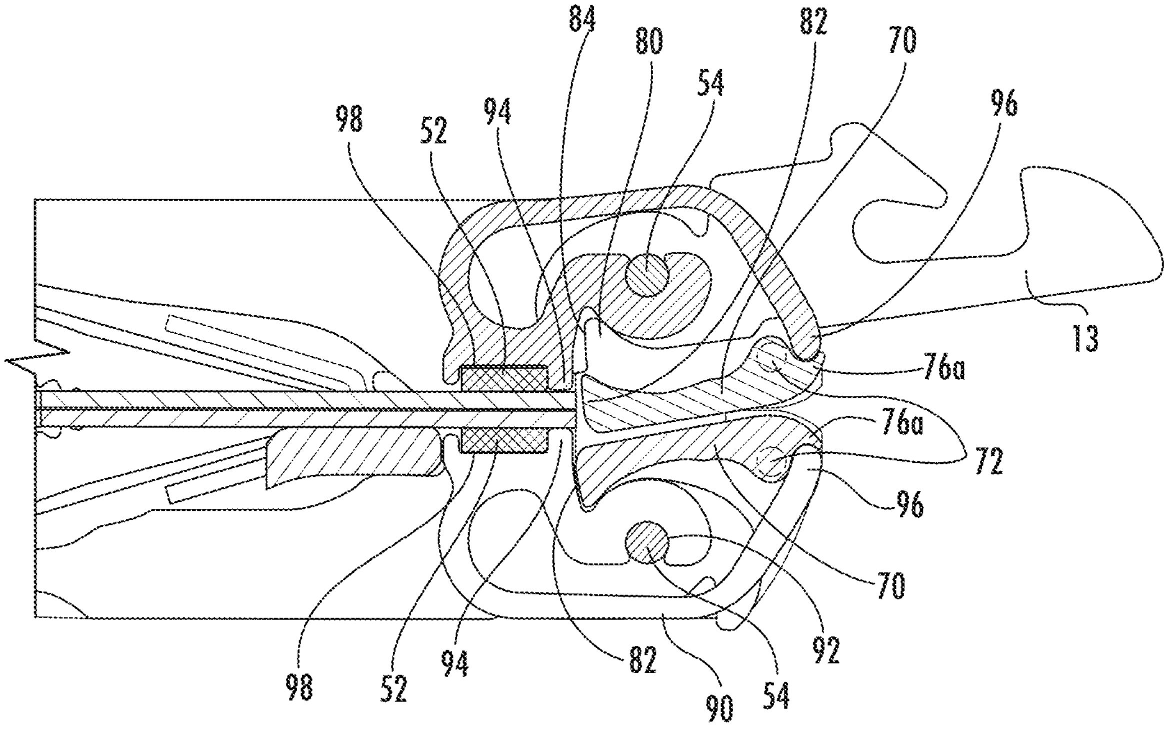
Figure 31:
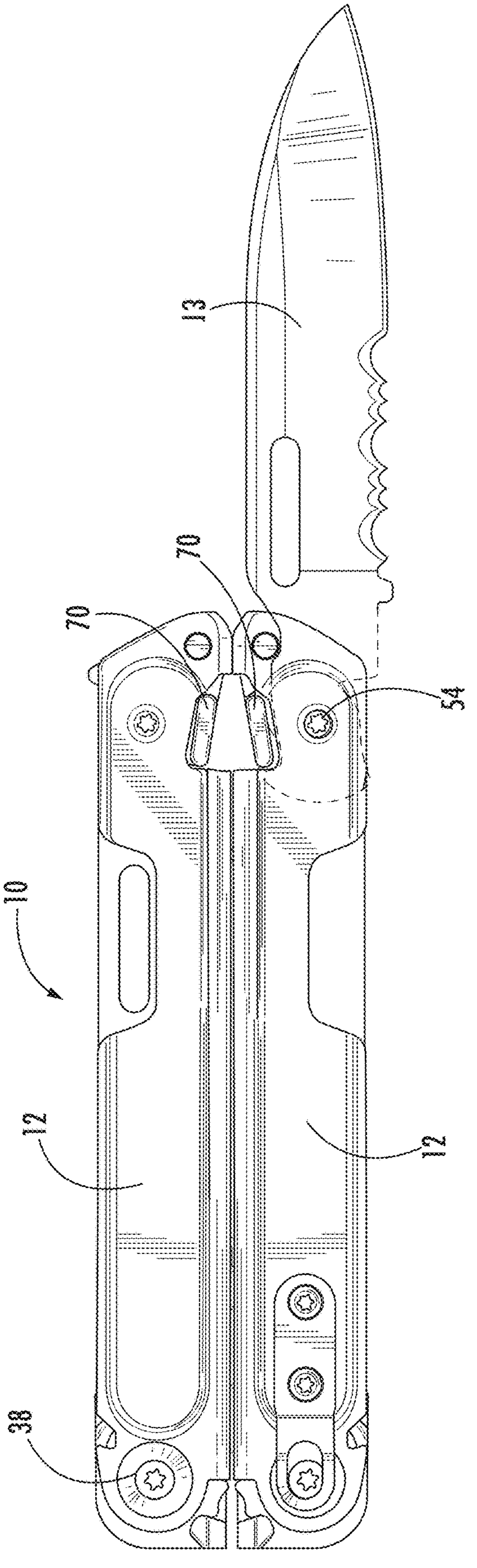
Figure 32:
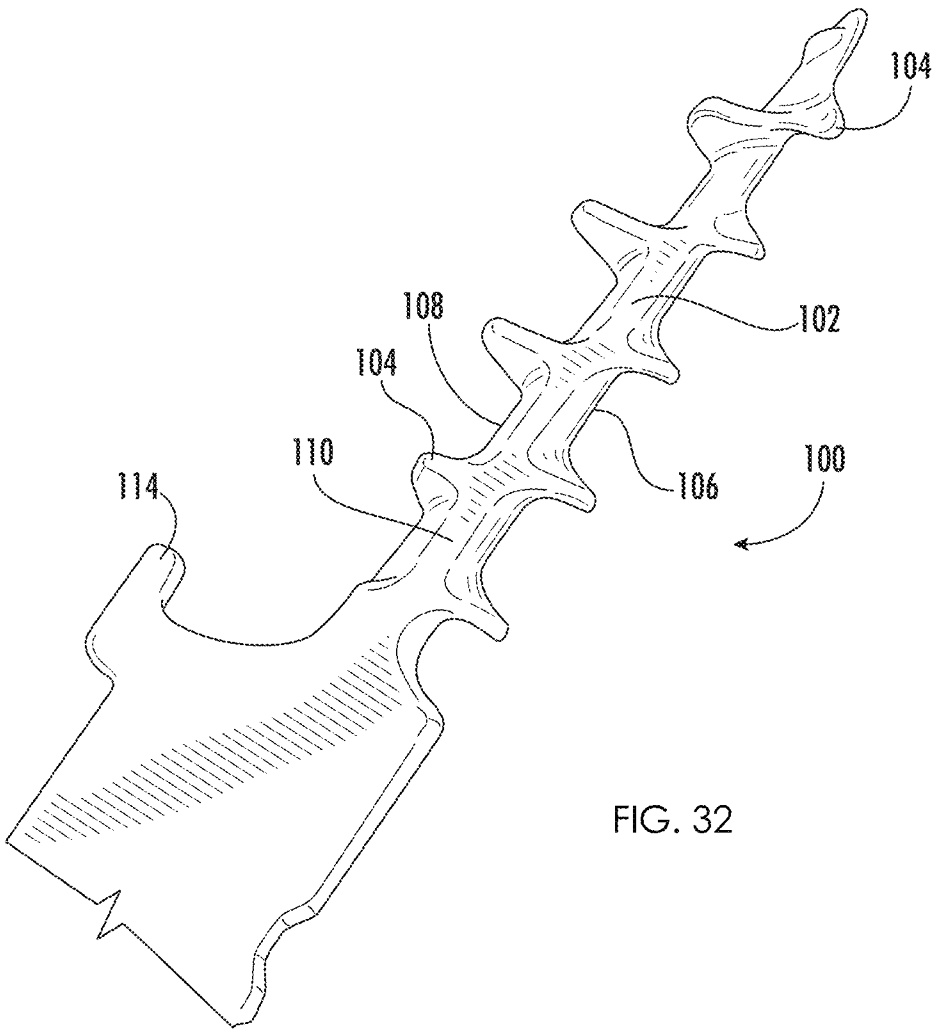
Figure 33:
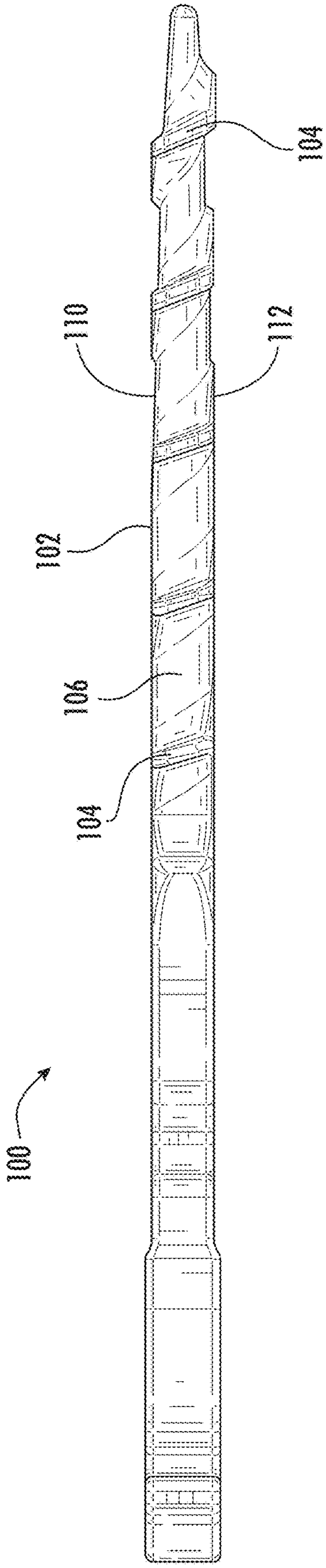
Figure 34:
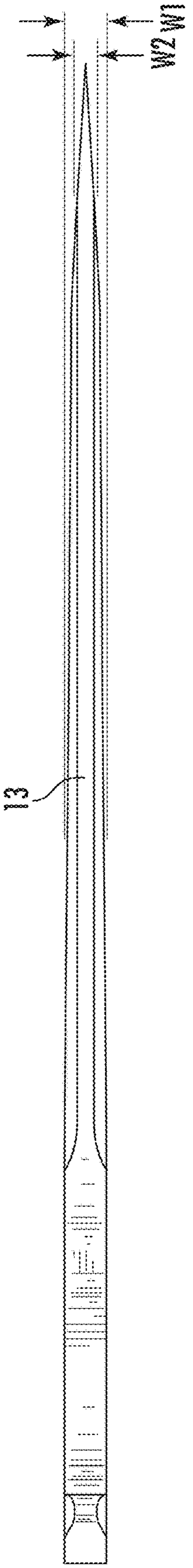
Figure 35:
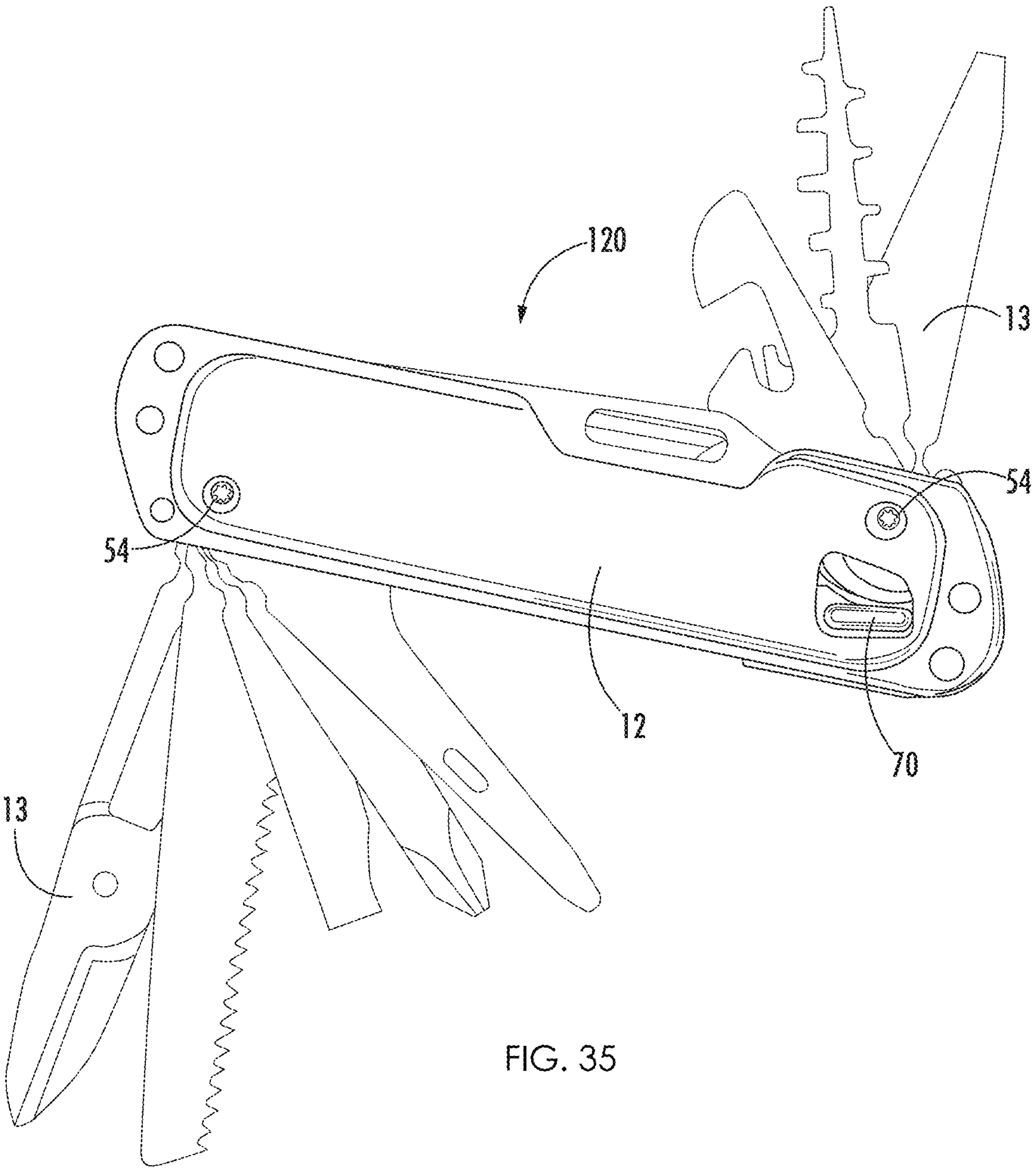

FIG. 23 is a cross-sectional side view of a multipurpose tool in accordance with an example embodiment of the present invention that illustrates interaction of the tool lock and a tool lock spring in a closed position;

FIG. 24 is a perspective view of a tool lock spring in accordance with an example embodiment of the present invention;

FIGS. 25 and 26 are fragmentary side views of a multipurpose tool in accordance with an example embodiment of the present invention that illustrates the deflection of the tool lock from the notches defined by the handles as a tool member is rotated from a closed position through an intermediate position;

FIGS. 27-29 are fragmentary cross-sectional views of a multipurpose tool in accordance with an example embodiment of the present invention that illustrates the interaction between the tool lock and the tool lock spring as a tool member is rotated from a closed position to an open position;

FIG. 30 is a fragmentary cross-sectional view of a multipurpose tool in accordance with an example embodiment of the present invention that illustrates the disengagement of the tool lock as a tool member begins to be rotated from the open position to a closed position;

FIG. 31 is a side view of a multipurpose tool in accordance with an example embodiment of the present invention in which a tool member is in the open position that illustrates the manner in which the tool locks seat within the notches defined by the handle;

FIG. 32 is a perspective view of a flat corkscrew in accordance with an example embodiment of the present invention;

FIG. 33 is a side view of the flat corkscrew of FIG. 32;

FIG. 34 is a top view of a tool member having a width that decreases from the tang of the tool member to the distal end of the tool member in accordance with an example embodiment of the present invention; and FIG. 35 is a side view of a folding knife in accordance with an example embodiment of the present invention.

DETAILED DESCRIPTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIGS. 1-3, a tool, such as a multipurpose tool 10, according to an example embodiment to the present invention is depicted. While the tool will be described in the context of a multipurpose tool, other types of tools may readily employ components of embodiments of the present invention including the inclusion of those components by knives and other types of tools that are not considered multipurpose tools. For purposes of illustration, but not of limitation, however, a multipurpose tool employing embodiments of the present invention will now be described.

The multipurpose tool 10 includes a plurality of handles 12, such as first and second handles, configured for movement relative to one another, as well as a plurality of tool members 13 carried by at least one of the handles. Typically the multipurpose tool includes a pair of generally elongate handles that extend in a lengthwise or longitudinal direction between opposed ends, such as a proximate end 12*a* and a distal end 12*b*. As a result of their connection, such as a pivotal connection, to one another and/or to one or more of the tool members, the handles can be moved toward and away from one another, such as to actuate a tool member as described below.

In this regard, the multipurpose tool 10 may be configured such that the handles 12 are adapted for relative movement between an open position as shown in FIG. 1 and a closed position as shown in FIG. 2. As will be apparent, the multipurpose tool has a compact form factor in the closed position to facilitate transport and storage of the multipurpose tool. One or more tool members carried by the multipurpose tool are generally accessible while the multipurpose tool is in the closed position. While the multipurpose tool is more expansive in the open position with the handles rotated so as to be further apart from one another, one or more different tool members of the multipurpose tool may be accessible and capable of being utilized in the open position, even though those same tool members(s) are stowed and generally inaccessible in the closed position.

Each handle 12 includes a pair of opposed sidewalls 14, such as first and second opposed sidewalls. The sidewalls are spaced apart from one another so as to define a channel within the handle to receive and store a plurality of tool members 13. In an example embodiment, the handle also includes a floor 16 extending from at least the first sidewall toward the second sidewall. As such, each handle has a cross-section that is generally U-shaped, such as defined by the opposed sidewalls and the floor that extends at least partially therebetween. Although the floor may extend completely across the channel to the second sidewall, the floor of the illustrated embodiment extends from the first sidewall to an intermediate portion of the channel so as to be spaced apart from the second sidewall. Likewise, in an example embodiment, the handle also includes a floor extending from the second sidewall toward the first sidewall. Although the floor may extend completely across the channel to the first sidewall, the floor of the illustrated embodiment extends from the second sidewall to an intermediate portion of the channel so as to be spaced apart from the first sidewall. In the illustrated embodiment, for the majority of the length of the handle, the floor that extends from the first sidewall and the second sidewall extends only a relative short distance toward the opposite sidewall, such as by extending outwardly from the respective sidewall by no more 20% and, in some embodiments, no more than 10% of the width of the channel. As such, the handle of an example embodiment has a relatively open bottom, which permits a user to see through the channel and readily identify the tool member of interest. The relatively open bottom also provides space for receiving the jaws 34 (as described below) upon folding the tool from the open position to the closed position.

In an example embodiment, in which the first and second handles 12 each includes a floor 16 extending from at least the first sidewall toward the second sidewall, the floor of each of the first and second handles includes an outwardly extending tab 18. The floor of each of the first and second handles also defines a hole 20 proximate the tab, such as adjacent the tab. With respect to the first handle, the tab may be closer to first handle than is the hole, while the second handle may define the hole to be closer to the first handle than the tab. In an example embodiment depicted in FIG. 4, the tab of the first handle is aligned with the hole of the second handle and the tab of the second handle is aligned with the hole of the first handle to permit the first and second handles to interlock in an instance in which the handles are brought to the closed position. In this regard, the tab of the first handle extends into and engages the hole of the second handle and the tab of the second handle extends into and engages the hole of the first handle in an instance in which the first and second handles are in the closed position. Once interlocked, the engagement of the tabs within the holes limits or prevents lateral movement between the first and second handles, thereby rendering the multipurpose tool 10 more rigid in the closed position and reducing or eliminating forces that might otherwise be placed upon other components of the multipurpose tool in response to oppositely directed lateral forces being placed upon the first and second handles.

In the illustrated embodiment, the portion of the floor 16 that includes the tab 18 and defines the hole 20 extends further across the channel than other portions of the floor. For example, the portion of the floor that includes the tab and defines the hole may extend across at least half and, in some embodiments, a majority of the width of the channel. However, the portion of the floor that includes the tab and defines the hole may be located proximate one end of a respective handle 12, such as a distal end **12*b* of the handle opposite the proximal end 12*a* to which the jaws 34 are rotatably connected as described below, such that the remainder of the floor extends a much shorter distance into the channel, such that the majority of the channel is visible through the floor and the jaws 34** (as described below) are able to be at least partially folded through the opening defined by the floor as the tool is transitioned from the open position to the closed position.

Although each handle 12 may be a single unitary structure, each handle may, instead, be formed of a plurality of discrete handle portions that are joined to one another to form the resulting handle. In the exploded perspective view illustrated in FIG. 5, each handle is formed of two handle portions that are attached to one another to form the handle. Each handle portion of this example embodiment includes a sidewall 14 and the floor 16 that extends inwardly from the respective sidewall. As described below, the handle of the illustrated embodiment also includes an axle 38 that extends between and interconnects the handle portions. The axle may be formed in various manners, such as by a pin and screw that engage one another. Each handle extends lengthwise or longitudinally between opposed ends, namely, a proximal end **12*a* and an opposed distal end 12*b***. The axle is generally located at the proximal end of the handle.

The multipurpose tool 10 of an example embodiment depicted in FIGS. 1 and 5 includes a tool member in the form of jaws 34 that are pivotally connected to one another, such as at a pivot point 36. Each jaw includes a working surface 37 extending in one direction from the pivot point and a base member 39 extending in an opposite direction from the pivot point. The jaws may include different types of working surfaces depending upon the tool function, such as a ribbed surface **37*a* in which the jaws comprise a pair of pliers and/or a blade or cutting surface 37*b* in which the jaws comprise a wire cutter. As shown in FIG. 7, the base member of each jaw defines an opening 40 through which the axle 38 of the respective handle 12 extends such that each jaw is both rotatably connected to a respective handle, such as the proximal end 12*a* of a respective handle, and pivotally connected to the other jaw member. Thus, the handles may be rotated from a handle closed position as shown in FIG. 2 in which the jaws are folded through the opening in the floor 16 into the channel so as to be stowed within the channel defined by the handle (and the proximal end 12*a* of the handle may be used as a hammer if so desired) through an intermediate position as shown in FIG. 6 to a handle open position as shown in FIG. 1 in which the jaws extend beyond the handles. In the open position, the handles may be alternately moved toward and away from one another so as to open and close the jaw members. As shown in FIGS. 12-14 discussed below, the handles may also include internal jaw stop members 31 that the jaws may contact as the handles are folded from the handle open position to the handle closed position so as to maintain the jaws in the desired position within the respective handles. The jaw stop members may be formed in various manners, but, in one embodiment extend at an angle into the channel from the portion of the floor that includes the outwardly extending tab 18 and defines the hole 20 proximate to the tab. See, for example, FIGS. 4 and 15** with respect to the tab and the hole proximate the tab.

As noted above, each jaw 34, such as the base member 39 of each jaw, defines an opening 40 through which the axle 38 extends. However, the opening is larger than the axle and, as such, the multipurpose tool also includes a resilient member 42 disposed at least partially within the opening. In an example embodiment, the resilient member is formed of an elastomeric material, such as polyurethane. As shown in FIG. 7, the opening may be elongated so as to define first and second differently sized portions with the axle extending through the first portion 40*a* of the opening and the resilient member disposed within the second portion 40*b* of the opening. As depicted in FIG. 7 and more clearly in FIGS. 12-14, the second portion may be larger than the first portion such that the resilient member disposed within the second portion is also larger than the first portion of the opening and, as a result, is retained within the second portion of the opening.

As shown in FIGS. 7-11, each jaw 34 and, more particularly, the base member 39 of each jaw includes a cam follower 44 configured to contact and ride along a cam surface 46 during at least a segment of the movement of the handles 12 between a closed position and an open position. In this regard, the cam follower and the cam surface are configured such that the cam follower contacts and rides along the cam surface during the last few degrees, such as the last 45° and, in one embodiment, the last 30°, of movement of the handles from the closed position to the open position, but to be spaced from the cam surface during other segments of the movement of the handles from the closed position to the open position. Similarly, the cam follower and the cam surface of this example embodiment are configured such that the cam follower contacts and rides along the cam surface during the first few degrees, such as the first 45° and, in one embodiment, the first 30°, of movement of the handles from the open position to the closed position, but to be spaced from the cam surface during other segments of the movement of the handles from the open position to the closed position. The cam surface may be defined by the respective handle, such as the proximal end 12*a* of the handle to which the jaw is rotatably connected, and/or by a cam member 48 disposed within the proximal end of the channel defined by the handle and mounted upon the axle 38. The cam surface defines a curved surface upon which the cam follower rides during rotation of the handles relative to the jaws. As shown in FIGS. 7-11, the cam surface includes a tapered portion 46*a* that tapers radially outward relative to the remainder of the circular cam surface. The portion of the cam surface that tapers radially outward is proximate one circumferential end of the cam surface and serves to engage the cam follower during the last few degrees of movement of the handles from the closed position to the open position and again during the first few degrees of movement of the handles from the open position to the closed position.

One embodiment of a cam surface 46 having a tapered portion 46*a* is described above. However, the cam surface may be differently configured in other embodiments. For example, instead of or in addition to the tapered portion of the illustrated embodiment that tapers radially outward proximate one circumferential end of the cam surface, the cam surface can include a tapered portion that tapers radially outward proximate the other circumferential end of the cam surface. This tapered portion of this other embodiment that is proximate the other circumferential end of the cam surface serves to engage the cam follower 44 during the first few degrees of movement of the handles from the closed position to the open position and again during the last few degrees of movement of the handles from the open position to the closed position. By engaging the cam follower during the first few degrees of movement of the handles from the closed position to the open position, the interaction of the tapered portion of the cam surface and the cam follower prevent inadvertent opening of the multipurpose tool 10 and, instead, requires the user to apply sufficient rotational force to overcome the engagement of the cam follower and the tapered portion of the cam surface. As yet another example embodiment, the cam surface and the cam follower may be configured such that the cam follower engages the cam surface throughout the entire movement of the handles between the open and closed positions and not just proximate one or both circumferential ends of the cam surface.

Although the cam follower 44 may be configured in various manners, the cam follower of an example embodiment includes lateral extending portions that extend in opposite directions from the base member 39 of the jaw 34. The laterally extending members extend in opposite directions so as to engage the cam surfaces 46 defined by the proximal ends 12*a* of the opposite sidewalls 14 of the handle 12 and/or by the cam members 48 positioned proximate the proximal ends of the opposite sidewalls of the handle. Thus, while the jaw including the base member of the jaw has a width that is less than the width of the channel to permit the jaw to be folded into the channel, the laterally extending members of the cam follower may have a width, in an example embodiment, that is greater than the width of channel and, in some embodiments has a width that equals or is approximately equal to the width of the respective handle.

During a segment of the relative rotation of the handle 12 with respect to the jaw 34 about the axle 38, the cam follower 44 of the base member 39 of the jaw rides upon the tapered portion 46*a* of the cam surface 46 which, in turn, has a fixed positional relationship to the handle 12 and the axle extending across the channel of the handle. The interaction of the cam follower with the tapered portion of the cam surface during a segment of the rotation of the handle with respect to the jaw causes the jaw to attempt to move relative to the handle and the axle extending across the channel defined by the handle such that the resilient member 42 moves toward the axle and the axle correspondingly appears to be attempting to move at least partially from the first portion 40*a* of the opening 40 toward the second portion 40*b* of the opening as shown in FIG. 13 relative to FIGS. 12 and 14. However, the resilient member within the second portion of the opening interacts with the axle and the jaw and applies a bias force to the jaw during the relative rotation of the handle such that the jaw is maintained in the same position relative to the axle with the axle continuing to extend through the first portion of the opening. As shown in FIGS. 7 and 12-14, the opening is elongated and extends at an angle, relative to a longitudinal axis defined by the respective handle between the opposed proximal and distal ends 12*a*, 12*b*, that is equal to or within a predefined angular range of the angle at which the force is applied to the jaw as a result of the interaction of the cam follower with the tapered portion of the cam surface during a segment of the rotation of the handle that causes the jaw to attempt to move relative to the handle and the axle extending across the channel defined by the handle. Thus, the bias force applied by the resilient member can be an oppositely directed and opposing force.

In the embodiment in which the bias force is applied by the resilient member 42 to the jaw 34 during a segment of the rotation of the jaw with respect to the handle 12, such as during the last few degrees, such as the last 45° or, in one embodiment, the last 30°, of movement of the handles from the closed position into the open position, the jaw will rotate freely with respect to the handle during the majority of the movement from the closed position to the open position, but the rotation of the handles will occur in a more controlled fashion during the last few degrees as the handles of this embodiment will not freely rotate during movement through these last few degrees. Thus, the multipurpose tool 10 provides for smooth opening and closing of the handles in order to alternately deploy and stow the jaws. However, the multipurpose tool prevents inadvertent opening of the handles by requiring the user to apply increased force to fully open the handles as a result of the interaction of the resilient member with the respective jaw.

Each handle 12 also defines a notch 50 proximate one end of the cam surface 46, such adjacent the tapered portion 46*a* at one end of the cam surface as shown in FIG. 7. The notch is sized to receive a member that extends outwardly, such as laterally, from the jaws 34, such as a post, a pin or, in the illustrated embodiment, the cam follower 44, once the jaw 34 has been rotated relative to the handle to the handle open position. Upon engagement of the cam follower within the notch, the handle is stopped from further rotation and remains in the handle open position in the absence of the application of sufficient force to dislodge the cam follower from the notch and to cause the handles to rotate relative to the jaws from the handle open position toward the handle closed position. Thus, the multipurpose tool 10 of this example embodiment prevents inadvertent closure of the handles as a result of the engagement of the cam follower within the corresponding notch defined proximate the cam surface and the requirement for the user to apply additional force to commence the folding of the handles.

While the illustrated embodiment of FIGS. 1-14 depict a multipurpose tool 10 with a single pair of jaws 34, embodiments described herein can include a second pair of jaws that provide additional functionality. FIG. 15 illustrates an example embodiment of the present invention including a first pair of jaws (including first jaw 134*a* and second jaw 134*b*) and a second pair of jaws (including third jaw 234*a* and fourth jaw 234*b*). The use of two pairs of jaws enables additional functionality while occupying substantially the same space as the single pair of jaws 34 described above. The first pair of jaws has a relatively shorter profile with the jaws extending a first distance from pivot point 36. The shorter profile of the first pair of jaws with a relatively shorter extension from the pivot point 36 enables a greater force to be applied between the tips 135 of the jaws. Such an increase in the force that can be applied at the tips of the jaws enables different functionality than the jaws 34 described above. The increase in leverage provides a greater ability to grasp, bend, or otherwise engage objects. For example, the tips 135 of the first jaw 134*a* and second jaw 134*b* are better suited for crimping wire connections, grasping/bending heavy gage wiring, or other applications requiring substantial force to be applied at the jaws. According to an example embodiment, the first pair of jaws can be configured as linesman pliers generally used to bend, twist, and cut metal. Optionally, the first pair of jaws can be combination pliers as shown in the illustrated embodiment. Combination pliers include a gripping surface proximate the tips 135 of the pliers, a rounded, serrated section 137 for gripping tubes, bolts, or other objects, and a cutting surface 139 proximate the pivot point 36. In addition to being capable of applying greater force due to the increased leverage, the first pair of jaws are better suited to be used in tighter quarters, such as when a bolt needs to be tightened, where relatively longer jaws may preclude access or turning of the bolt.

The example embodiment of FIG. 15 further includes a second pair of jaws (including third jaw 234*a* and fourth jaw 234*b*) that are relatively longer than the first pair of jaws and provide additional and different functionality relative to the first pair of jaws. The second pair of jaws include tips 235 that extend further from the pivot point 36 providing greater reach than the first pair of jaws. The second pair of jaws further include a finer point to the tips thereby enabling engagement with smaller objects. While the third jaw 234*a* and fourth jaw 234*b* may not be capable of exerting as great a force as between the first jaw 134*a* and the second jaw 134*b*, the second pair of jaws can provide a finer degree of accuracy with the functionality of needle-nosed pliers, jeweler's pliers, or similar.

The first pair of jaws of the example embodiment function as described above and are deployed in the same manner as jaws 34 of FIGS. 6-11. As shown in FIG. 16, the first jaw 134*a* and second jaw 134*b* are deployed while the second pair of jaws are stowed within respective handles including the first handle 12*a* and second handle 12*b*. The first pair of jaws each include a cam follower, including a first cam follower 44*a* connected to the first jaw 134*a* and a second cam follower 44*b* connected to the second jaw 134*b*, configured to contact and ride along cam surface (including a first cam surface 47*a* of the first handle and second cam surface 47*b* of the second handle) during at least a portion of the movement of the handles between a closed position and the open position shown in FIG. 16. The cam followers 44*a*, 44*b* and cam surfaces 47*a*, 47*b* are configured such that the cam followers contact and ride along the respective cam surface during at least the last few degrees of opening to the open position. The cam surfaces of the illustrated embodiment are defined by the respective handle to which the respective jaw is connected.

With reference to FIGS. 7-11, the cam surfaces (47*a* and 47*b*) of an example embodiment include a tapered portion 46*a* that tapers radially outward relative to the remainder of the circular cam surface. The portion of the cam surface that tapers radially outward is proximate one circumferential end of the cam surface and serves to engage the cam follower during the last few degrees of movement of the handles from the closed position to the open position and again during the first few degrees of movement of the handles from the open position to the closed position.

The first handle 12*a* defines a first notch 50*a* proximate one end of the first cam surface 47*a* while the second handle 12*b* defines a second notch 50*b* proximate one end of the second cam surface 47*b*, such as adjacent the tapered portion of the cam surfaces as shown in FIG. 7. The notch is sized to receive a member that extends outwardly, such as laterally, from the first pair of jaws, such as a post, a pin or, in the illustrated embodiment, the cam followers 44*a* and 44*b*, once the first pair of jaws 134*a* and 134*b* have been rotated relative to the handle to the handle open position. Upon engagement of the cam follower within the notch, the handle is stopped from further rotation and remains in the handle open position in the absence of the application of sufficient force to dislodge the cam follower from the notch and to cause the handles to rotate relative to the jaws from the handle open position toward the handle closed position. Thus, the multipurpose tool 10 of this example embodiment prevents inadvertent closure of the handles as a result of the engagement of the cam follower within the corresponding notch defined proximate the cam surface and the requirement for the user to apply additional force to commence the folding of the handles.

The multipurpose tool 10 can be used as a pair of pliers in the configuration shown in FIG. 16 with the relatively shorter first pair of jaws including first jaw 134*a* and second jaw 134*b*. However, embodiments described herein further include the second pair of jaws including third jaw 234*a* and fourth jaw 234*b* as illustrated in FIG. 15. These third jaw 234*a* is stowed within the second handle 12*b* and rotates out of the second handle about second axle 38*b* while the fourth jaw 234*b* is stowed within the first handle 12*a* and rotates out of the first handle abut first axle 38*a*, illustrated in FIG. 17. In the deployed position, the first pair of jaws engages the second pair of jaws in such a way that the first pair of jaws helps drive the tips of the second pair of jaws together. FIG. 18 illustrates the second pair of jaws (third jaw 234*a* and fourth jaw 234*b*) engaged with the first pair of jaws (first jaw 134*a* and second jaw 134*b*). The second pair of jaws include cavities defined therein to receive the first pair of jaws. The tips 135 of the first pair of jaws are received within the cavities of the second pair of jaws, with each tip engaging a respective flange 230 of the second pair of jaws. The flange enables pressure to be applied from the tips 135 of the first pair of jaws to the flange 230 driving the tips 235 of the second pair of jaws together.

To move from the stowed position of FIG. 16 to the deployed position of FIG. 18, the second pair of jaws (third jaw 234*a* and fourth jaw 234*b*) is initially rotated out of the respective handles (second handle 12*b* and first handle 12*a*) to a partially-deployed position as illustrated in FIG. 15. The handles of the multipurpose tool 10 are then opened at least partially, thereby spreading apart the first pair of jaws. FIG. 19 illustrates the first pair of jaws at least partially opened at 102. The second pair of jaws pivot about pivot points 138*a* and 138*b* (corresponding to the first axle 38*a* and second axle 38*b* of FIG. 15), where the respective axle about which each jaw of the second pair of jaws pivots is attached to the opposing jaw of the first pair of jaws. This configuration allows the jaws of the first pair of jaws to be received into the cavities of the second pair of jaws when the first pair of jaws is in the partially opened position.

As shown in FIG. 19, in the partially open position shown at 102, a distance between the tip 135 of the first jaw 134*a* and the pivot point 138*b* is shorter than a distance between the pivot point 138*b* and the tip 135 of the first jaw 134*a* of the first pair of jaws in the closed position shown at 104. In transitioning from the partially open position shown at 102 and the closed position shown at 104, the first pair of jaws are received within the cavities of the second pair of jaws, and the tips 135 of the first pair of jaws engage the flanges 230 of the second pair of jaws. This enables the first pair of jaws to engage and drive together the second pair of jaws.

The first jaw 134*a* and second jaw 134*b* of the first pair of jaws of the embodiment of FIGS. 15-19 are operable in the same manner as the jaws 34 described above with respect to FIGS. 1-14. The second pair of jaws rely on a different mechanism for operation (e.g., opening and closing with the movement of the handles). FIG. 20 illustrates third jaw 234*a* of the second pair of jaws in the partially deployed position with the first pair of jaws in an at least partially open position. A cam 240*a* is illustrated attached to the third jaw 234*a* of the second pair of jaws and both rotate about second axle 38*b*. During rotation of the third jaw 234*a* of the second pair of jaws relative to the second handle 12*b*, the cam 240*a* rotates relative to the cam follower 44*b* of the first jaw 134*a* of the first pair of jaws. The cam 240*a* can be integrally formed with the third jaw 234*a* or separate therefrom while fixedly attached to the third jaw. The cam 240*a* of the illustrated embodiment is between the opposed sidewalls of the second handle 12*b*, not visible in FIGS. 15-19.

During relative rotation of the second handle 12*b* with respect to the third jaw 234*a* of the second pair of jaws about the second axle 38*b*, the first cam follower 44*b* rides upon a surface of the cam 240*a*. The interaction of the first cam follower 44*b* with the cam surface of cam 240*a* during a portion of the rotation of the second handle 12*b* with respect to the third jaw 234*a* causes the third jaw to attempt to move relative to the second handle 12*b* and the second axle 38*b* extending across the channel defined by the handle such that the resilient member 142 (similar to resilient member 42 of FIG. 12). FIG. 21 more clearly illustrates a graphical depiction of the movement of the third jaw 234*a* of the second pair of jaws relative to the second handle 12*b* and the first jaw 134*a* of the first pair of jaws.

The cam 240*a* rotates with the jaw relative to the cam follower 44*a* as shown at 106. As the cam 240*a* rotates with the third jaw 234*a* of the second pair of jaws, the cam surface of the cam rides along the cam follower 44*b*, attached to the second jaw 134*b* of the first pair of jaws. A portion of the surface of the cam 240*a* drives the cam and the axle 38*b* toward resilient member 142 within the slot 140 as shown at 108, compressing the resilient member within the slot. As the cam 240*a* continues to rotate with the third jaw 234*a* of the second pair of jaws relative to the cam follower 44*b*, the resilient member biases the axle 38*b* back into the original orientation in the slot, and a drive surface 241*a* of the cam 240*a* is engaged with the cam follower 44*b* in such a way that the third jaw 234*a* of the second pair of jaws is biased toward the first jaw 134*a* of the first pair of jaws when the first pair of jaws moves between an open and closed position. FIG. 22 illustrates the second pair of jaws engaged with the first pair of jaws and the cam 240*a* engaged with the cam follower 44*b* in such a way that the drive surface 241*a* of the cam is driven by cam follower 44*b* to press the third jaw 234*a* into engagement with the first jaw 134*a*.

According to example embodiments described herein, the second pair of jaws can include different types of jaws for different functions. For example, the second pair of jaws can include non-marring contact surfaces, such as contact surfaces made of nylon useful for grasping objects that may be susceptible to marring (e.g., jewelry repair, eye glass repair, etc.). The jaws of the second pair of jaws can be non-conductive for electronic work, such as for placement of semiconductor chips on a circuit board. The jaws of the second pair of jaws can include needle nose plier jaws as described above, snap-ring plier jaws, combination plier jaws, flat-nose plier jaws, etc.

In order to bias the handles 12 into a closed position and to avoid inadvertent opening of the handles from the closed position, the multipurpose tool 10 may include a first magnet 52 carried by one of the handles and, more typically, first and second magnets carried by the first and second handles, respectively, as shown in FIG. 23. In this regard, the first and second magnets may be spatially aligned with one another when the handles are in the closed position. The magnets are generally carried by the handles so as to be closer to the distal ends 12*b* of the handles that separate from one another as the handles are moved from the closed position to the open position than the proximal ends 12*a* of the handles. In one example embodiment, the magnets are positioned by a distance of about 5% to about 25% of the length of the handles from the distal end of the handles. The magnets generate a magnetic force. The magnetic force is directed in a flux path that extends through the handles and/or components, such as the tool members 13, carried by the handles. The magnetic force is an attractive magnetic force such that the magnetic force biases the handles toward one another in the closed position. The magnets are configured, however, such that the magnetic force may be overcome by an opening force applied by a user in order to intentionally open the handles from the closed position to the open position. Thus, the magnetic force prevents the inadvertent opening of the handles from the closed position to the open position, but allows the opening of the handles once the user has supplied a sufficient force.

Additionally, the attractive magnetic force provided by the magnets 52 carried by the handles 12 is primarily applicable when the handles are relatively close to one another, such as in an instance in which the handles have been opened so as to define an internal angle therebetween of no more than about 5° and, more particular, 3°. Thereafter, as the handles are more fully opened, the magnetic force has much more limited or even negligible impact upon the force required to open the handles. The multipurpose tool 10 of an example embodiment may be opened by a user holding the multipurpose tool with one hand, such as by holding one of the handles of the multipurpose tool, and then applying a rotating force to the multipurpose tool, such as by flipping the handle that is not being held by the user away from the handle that the user is holding, thereby causing the magnetic force to be overcome and the distal ends 12*b* of the handles to separate with the handles thereafter rotating from the closed position to the open position. Conversely, when the handles are closed from the open position to the closed position, the magnetic forces provided by the magnets may assist with fully closing the handles as the distal ends of the handles are brought relatively close to one another.

In addition to the jaws (e.g., the single pair of jaws 34 and/or the first and second pairs of jaws 134, 234), the multipurpose tool 10 generally includes a number of other tool members 13. In the illustrated embodiment, the distal end 12*b* of each handle 12 also includes an axle 54 that extends between the opposed sidewalls 14 of the handles. A plurality of the tool members of the multipurpose tool may be rotatably mounted upon the axle proximate the distal end and, in an example embodiment, a plurality of tool members are mounted upon the axles at the distal ends of both the first and second handles. Unlike the jaws 34 that are disposed within the handles and are inaccessible when the handles are in the closed position, the other tool members are configured to be opened while the handles are in the closed position and, as such, open through the surface of the handles (opposite the floor 16) that is exposed when the handles are in the closed position.

While the multipurpose tool 10 may include a variety of different tool members 13 and different combinations of tool members depending upon the type of multipurpose tool, the user preferences or the like, examples of some of the shorter tool members include a bit driver, a file, a pair of scissors, a bottle opener, a screwdriver, an a small knife, while the longer tool members may include one or more knife blades, a saw blade and/or a file. By including both longer tool members and shorter tool members, the utility of the resulting multipurpose tool may be enhanced, particularly with the inclusion of longer tool members that are selected such that the functions performed by the longer tool members, such as the knife blades and saw blades, can be performed more efficiently as a result of the increased length relative to the shorter tool members. Additionally, the handles 12 may be formed, such as with rounded corners, and the tool members may be disposed within the handles while in the closed position in order to provide a relatively smooth surface for the user to grasp and press against while utilizing the tool members, particularly the longer tool members.

Although the tool members 13 may be opened in various manners, the tool members of an example embodiment include a notch 56 proximate the axle 54 upon which the tool members are mounted and, in an example embodiment, positioned closer to the distal end 12*b* of the handles 12 than the axle. As shown in FIGS. 1 and 2, the notch extends laterally across the tool members mounted upon the axle in a direction extending between the opposed sidewalls 14 of the handle. The notch is defined by the edge of the tool members that is exposed in an instance in which the tool members are folded into the channel defined by the handle. In other words, the notch opens outwardly from the multipurpose tool 10 in an instance in which the tool members are folded into the channel defined by the handle so as to serve as a finger ledge or hook to be engaged by the user in order to at least partially rotatably open the tool members relative to the handle. Upon application of a force by the user to the notch, such as by positioning the thumb of the user upon the rear surfaces of the tool members that are exposed within the channel of the handle and applying a force, such as a sliding force directed toward the distal end of the handles, with the thumb of the user engaging the notch, one or more of the shorter tool members may be rotatably opened, at least partially, from the respective handle. In this regard, a notch may be defined in a uniform and aligned manner by each of the shorter tool members mounted upon the axle such that the notch defined by each of the shorter tool members carried by a respective handle may be engaged at one time by the user, such as by the thumb of the user applying the sliding motion toward the distal end of the handle. As a result the tool members may be readily accessed by a user using one hand, such as the thumb of the user, even while the user wearing gloves without requiring the user to use their fingernails in order to pry the tool members out of the handle. Although the longer tool members may also define a notch, the longer tool members of some embodiments may also or alternatively be accessed via a cutout 60 as described below. In this example embodiment, the shorter tool members may exhibit clumping in which all or at least a plurality of the shorter tool members are at least partially opened at the same time by the application of the distally directed sliding force by the user. Once the plurality of shorter tool members have been at least partially opened, such as in a clumped fashion, the user may more readily identify the tool member that the user desires to utilize and may then close the other tool members and fully open the tool member that is desired to be utilized. Thus, the user is largely spared from having to identify the particular tool member that is desired to be utilized while the tool members are fully folded into the handle and similarly is spared from simply having to guess and repeatedly open different ones of the tool members, one at a time, in an effort to locate the desired tool member. Instead, the opening of a plurality of tool members in a clumped fashion with the single application of an opening force by the user allows the user to more readily identify and select the tool to be utilized while simply folding the other tools back into the handle.

Although described herein in the context of particular embodiments of a multipurpose tool 10, a wide variety of multipurpose tools may include one or more tool members that define a notch 56 in order to facilitate user accessibility. For example, a tool having a single handle may include one or more tool members that define a notch to permit the user to rotatably open the tool member(s) without having to utilize their fingernails.

The portion of the tool members 13 that is exposed through the channel defined by the handles 12 when in a closed position may include a plurality of grooves 58 extending laterally across the plurality of tool members. Although the grooves may extend across all of the tool members as shown in FIG. 1, the grooves extending across the shorter tool members, but not the longer tool members in other embodiments. The grooves are spaced longitudinally in an aligned manner across the plurality of shorter tool members. The grooves provide a visible indication to a user as to where to press in order to apply the opening force to the tool members. In addition, the grooves provide some additional grip during use of the tool members.

The tool members 13 are rotatably mounted upon the axle 54 and configured to rotate between a tool member open position in which the one or more tool members extend from the handle 12 and a tool member closed position in which the one or more tool members are folded into the handle. The jaws 34, and, in one embodiment, the cam followers 44 of the jaws are configured to control the movement of the tool members between the closed and open positions depending upon whether the multipurpose tool 10 and, more particularly, the first and second handles of the multipurpose tool are in the handle closed position or the handle open position. In the handle open position, the jaws have been rotated relative to the respective handles. Consequently, the cam follower of each jaw has correspondingly moved relative to the respective cam surface 46 such that the cam follower engages at least some of the tool members, such as the longer tool members, if an effort is made to open the tool members. Thus, the tool members are maintained in a closed position and the tool members are prevented from transitioning to an open position while the multipurpose tool is in a handle open position. See FIG. 6 in which the cam followers overlie distal ends of at least some of the tool members, such as the longer tool members, and are positioned in the path of travel of the tool members during the transition from a closed position to an open position, thereby limiting such rotational movement of at least the longer tool members and preventing at least the longer tool members from being fully opened. In this example embodiment, the cam followers do not prevent all of the tool members from being opened and one or more of the tool members, such as the shorter tool members, continue to be able to be rotated from the closed position to the open position while in the handle open position. However, in an instance in which the multipurpose tool is in a handle closed position, the jaws have rotated relative to the respective handles and the cam follower of each jaw has correspondingly moved relative to the respective cam surface such that the cam followers are now positioned outside of the path of travel of the tool members, including the longer tool members. As such, while the multipurpose tool is in the handle closed position, the tool members, including the longer tool members, may be moved from a tool member closed position to a tool member open position without any interference by or contact with the cam followers.

In the example embodiment described above, the cam followers 44 serve to limit the rotational movement of one or more of the tool members 13 from the closed position to the open positon while in the handle open position. However, cam followers need not provide this function and, instead, the multipurpose tool 10 and, more particularly, the jaws 34 may include another member, such as a pin or a post extending outwardly, such as laterally, from the jaws, that serve to block rotation of at least some of the tool members, such as the longer tool members, and correspondingly limit the rotational movement of one or more of the tool members 13 from the closed position to the open position in a comparable manner while in the handle open position.

The multipurpose tool 10 of an example embodiment also includes a tool lock 70, one of which is carried by each handle 12 that includes one or more tool members 13 that are configured for rotation into and out of the channel defined by the respective handle. The tool lock is configured to engage the one or more tool members of a respective handle in an instance in which the tool members have been rotated into the tool member open position and to resist, e.g., prevent, rotation of the one or more tool members to the tool member closed position until the tool lock has been affirmatively disengaged, such as by the user, from the one or more tool members. As shown, for example, in FIGS. 1 and 4, the tool locks may be positioned proximate the distal ends 12*b* of the handles. In this regard, the tool lock may be rotatably connected to the distal end of a respective handle, such as by a pin 72 that defines a tool lock rotational axis and that extends between the opposed sidewalls 14 of the respective handle and through the tool lock. Although the tool lock may have various configurations, the tool lock of an example embodiment has a generally T-shape with a wide engagement portion 74 and a narrower base portion 76 through which the pin extends. In this regard, the base portion generally has a width that is no wider than and, in some embodiments, narrower than the width of the channel defined by the respective handle, while the width of the engagement portion is broader than the width of the channel and, in some embodiments, is the same width or approximately the same width as the handle. In order to accommodate the engagement portion of the tool lock, the sidewalls of the handle define notches 78 in which the engagement portion of the tool lock are seated.

The tool lock 70 is biased into engagement with the tool members 13 such that the engagement portion 74 of the tool lock is seated within notches 78 defined by the sidewalls 14 of the respective handle 12. The tool members and, more particularly, the spine of each tool member defines a recess 80 that is aligned with the engagement portion of the tool lock in an instance in which the tool members are in the tool member open position. As such, the engagement portion of the tool lock is biased into engagement with and is seated within the recess of the one or more tool members in the tool member open position. The engagement of the tool lock with the recess defined by a tool member prevents the tool member from being moved from the tool member open position to the tool member closed position until such time that the tool lock has been disengaged from the recess defined by the tool member, such as by the user applying a lifting force to the engagement portion of the tool member so as to move the tool lock from an engaged position to a disengaged position and thereafter rotating the tool member relative to the respective handle.

As shown in FIG. 1, the distal end 82 of the tool lock 70, that is, the distal end of the engagement portion 74 of the tool lock, that is furthest from the distal end 12*b* of the respective handle 12 has an at least partially curved profile, such as a rounded profile. In contrast, the recess 80 defined by each tool member 13 in which the engagement portion of the tool lock is seated in an instance in which the tool member is in the tool member open position has a planar end wall 84 (see FIG. 28) defining that portion of the recess furthest from the distal end of the respective handle. The planar end wall of the recess defined by the tool member is proximate the distal end of the tool lock in an instance in which the tool lock is seated within and engages the recess defined by the tool member such that the distal end of the tool lock contacts the end wall of the recess along a line of contact which, in an example embodiment, extends in parallel relationship to the tool lock rotational axis. The distal end of the tool lock of an example embodiment has a convex curved shape that defines a plurality of lines parallel to the tool lock rotational axis. The convex curved shape of the distal end of the tool lock of this example embodiment causes the distance between the tool lock rotational axis and the line of contact between the tool lock and the end wall of the recess to increase as the tool lock is rotated further into the recess and, correspondingly, further into the locking position. As such, any attempt to fold the tool member from the tool member open position to the tool member closed position without first disengaging the tool lock will prevent movement of the tool member from the tool member open position to the tool member closed position without first disengaging the tool lock from the tool member since the angle of curvature of the tool lock is sufficiently shallow that the frictional forces prevent the tool lock from releasing, absent user input.

By defining the recess 80 in each of the tool members 13 that are to be engaged by the tool lock 70 so as to have a planar end wall 84, while limiting the curved profile to the distal end 82 of the tool lock, the manufacture of the multipurpose tool 10 is made more efficient. In this regard, the recess that must be defined in each of a plurality of tool members may be more readily manufactured since the creation of a recess having a planar end wall is a more efficient process than creating a recess having a curved end wall. Instead, only a single part, that is, the distal end of the tool luck is formed with the curved profile.

As noted above, the tool lock 70 is biased into the engaged position with the recess 80 defined by a tool member 13 in an instance in which the tool member is in the tool member open position. In an example embodiment depicted in FIGS. 29 and 31, the tool lock is biased by a tool lock spring 90 disposed within the channel of the respective handle 12. The tool lock spring is shown in more detail in FIG. 24. The tool lock spring defines an opening 92, such as either a full or partial opening, through which the axle 54 extends. The tool lock spring includes and extends between first and second spring portions 94, 96 on opposite sides of the opening through which the axle extends. As shown in FIG. 29, the tool lock spring is mounted upon the axle such that the first spring portion operably engages the handle and the second spring portion operably engages the tool lock. In this regard, the first spring portion may directly contact the handle or, alternatively, the first spring portion may directly contact another member that, in turn, is disposed in a fixed position relative to the handle. Similarly, the second spring portion may directly contact the tool lock or, alternatively, may directly contact another component that, in turn, is in direct contact with and moves with the tool lock. The first spring portion may engage different portions of the handle. In an example embodiment, however, the first spring portion engages the floor 16 of the handle. The second spring portion may also engage different portions of the tool lock, but, in one embodiment, operably engages the base portion 76 and, more particularly, a proximal portion 76*a* of the base portion that is disposed on the opposite side of the pin 72 from the engagement portion 74. In this regard, the second spring portion of an example embodiment is configured to engage an inner surface of the base portion of the tool lock, that is, the surface of the tool lock that faces the interior of the handle, at a location on the opposite side of the pin from the engagement portion. As such, the bias force applied by the tool lock spring urges the proximal portion of the base portion of the tool lock in a direction out of the channel and correspondingly urges the engagement portion of the tool lock in a direction into the channel and, correspondingly, into the notches 78 defined by the opposed sidewalls 14 of the respective handle.

The multipurpose tool 10 of an example embodiment may include a plurality of tool lock springs 90 mounted upon the same axle 54 and configured to apply a bias force to the tool lock 70 so as to urge the tool lock into engagement with the one or more tool members 13. As such, the multipurpose tool of an example embodiment may include a second tool lock spring and potentially additional tool lock springs, each of which also defines an opening through which the axle extends. One or more tool members may also be mounted upon the axle and positioned between the plurality of tool lock springs, such as the first and second tool lock springs. The plurality of tool lock springs may be positioned symmetrically upon the axle relative to the width of the channel such that the plurality of tool lock springs apply relatively even amounts of bias force across the width of the tool lock, thereby facilitating secure engagement of the tool lock with the tool members on each of the opposed sides of the respective handle.

Once the tool lock 70 has engaged the recess 80 defined by a tool member 13 in an instance in which the tool member is in a tool member open position as shown in FIG. 14, the tool lock must be manually disengaged from the recess defined by the tool member. In this regard, the user must apply a lifting force to the engagement portion of the tool lock that rotates the tool lock such that the engagement portion 74 moves in an upward direction out of the channel defined by the respective handle. The tool member may then be rotated from the tool member open position to the tool member closed position as shown by the sequential series of FIGS. 29, 29, and 40. As such, the tool lock has a path of travel from an engaged position in which the engagement portion of the tool lock is driven by the bias force into the notches 78 defined by the opposed sidewalls 14 of the respective handle 12 and into the recess defined by a tool member in the tool member open position to a disengaged position in response to a lifting force applied by a user in which the tool lock is rotated relative to the handle such that the engagement portion is disengaged from the notches defined by the opposed sidewalls of the respective handle and from the recess defined by the tool member so as to permit the tool member to be rotated from the tool member open position to the tool member closed position. The path of travel of the tool lock therefore extends out of the channel and beyond the respective handle.

In an instance in which the multipurpose tool 10 is in a handle closed position and a tool member 13 is in a tool member open position with the engagement portion 74 of the tool lock 70 engaging the recess 80 defined by the tool member, the path of travel of the tool lock in response to a lifting force extends beyond the respective handle to which the tool lock is pivotally connected and into the notches 78 defined by the opposed sidewalls 14 of the other handle 12 as shown in FIGS. 26 and 30. In other words, the disengaged position of the tool lock lies outside of the envelope defined by the respective handle to which the tool lock is pivotally connected and within envelope defined by the body of the other handle, such as within the notches defined by the opposed sidewalls of the other handle. By having the plurality of handles of the multipurpose tool define notches in the opposed sidewalls that are aligned with one another in an instance in which the handles are in a handle closed position, the multipurpose tool may be more compact by allowing the path of travel of the tool lock of each handle to extend into notches defined by the opposed sidewalls of the other handle.

In addition to locking the tool members 13 in the tool member open position, the tool lock 70 also applies a bias force that must be overcome to rotate a tool member between the tool member closed position and the tool member open position. In this regard and as shown by FIGS. 26 and 28, the tool lock engages the tang of the tool member as the tool members are rotated between the tool member closed position and the tool member open position. In this regard, the peripheral edge of the tang may define a curved surface that the tool lock rides upon as the tool member moves between the tool member closed position and the tool member open position. The tool lock does not prevent the opening of a tool member, but provides the bias force in the form of frictional resistance as the engagement portion 74 of the tool lock is deflected outwardly by its engagement with the peripheral edge of the tang of the tool member until the engagement portion of the tool lock becomes aligned with the recess 80 defined by the tool member and is urged by the bias force into engagement with the recess. As such, the interaction of the tool lock with the tool member as the tool member is moved between a tool member closed position to a tool member open position prevents the tool members from being opened in uncontrolled fashion.

In an example embodiment, the magnets 52 carried by the handles 12, such as proximate the floor 16 of each handle, also serve to bias the tool members 13 into a tool member closed position. The magnetic forces that bias the tool members into a tool member closed position may be overcome by the user who applies a lifting force to rotate the tool members from the tool member closed position to the tool member open position. However, the magnetic forces also prevent uncontrolled or inadvertent opening of a tool member.

In an example embodiment, the tool lock spring 90 and, more particularly, the first spring portion 94 of the tool lock spring is configured to receive the magnet 52. In this regard, the first spring portion of the tool lock spring may define a recess 98 in order to receive the magnet. Thus, the tool lock spring may serve multiple purposes in order to both bias the tool lock 70 into an engaged position and to secure the magnets within the respective handle 12.

The tool members 13, such as the tang of the tool members, may be configured such that the longer tool members are physically closer to the magnet 52 than the shorter tool members in an instance in which the tool members are in a tool member closed position. As such, the magnet of this example embodiment may bias the longer tool members into the tool member closed position with somewhat greater magnetic force than the shorter tool members. Both longer and shorter tool members are generally spaced somewhat from the magnet (with shorter tool members spaced by a greater distance from the magnet than the longer tool members).

As noted above, the multipurpose tool 10 can include a variety of tool members 13. For example, one tool member may be a flat corkscrew 100. As shown in FIG. 32, the flat corkscrew includes a shaft 102 and threads 104 extending outwardly from first and second opposed sides 106, 108 of the shaft. However, the threads of the flat corkscrew are discontinuous so as to not extend completely about the shaft and so as not to extend between the first and second opposed sides. In this regard, the shaft has third and fourth opposed sides 110, 112 between the first and second opposed sides with the third and fourth opposed sides having a planar configuration. See FIG. 33. The third and fourth sides do not include the helical threads. As a result of its configuration, the flat corkscrew may be included within the tool members carried by a respective handle 12, such as by being rotatably mounted upon the axle 54, but does not require as much space within the handle as a conventional corkscrew in which the threads wrap helically about the entire shaft. However, the threads of the first and second opposed sides of the shaft are sufficient to permit the corkscrew to engage corks and to perform its intended corkscrew function. In some embodiments, the flat corkscrew also includes a bottle cap lifter 114.

The tool members 13 may be formed in various manners. In an example embodiment, however, one or more of the tool members may include a tang that defines the aperture through which the axle 54 extends and a tool, e.g., knife blade, saw blade, screwdriver blade, etc., extending outwardly from the tang. In this example embodiment, at least a distal end of the tool that is furthest from the tang is tapered so as to have a narrower width than the tang. In this regard, the tool may be tapered such that the width of the tool progressively decreases from the proximal end of the tool proximate the tang, such as from the pivot point of the tool, to the distal end of the tool furthest from the tang. With reference to FIG. 34, for example, the width W1 of the blade near the distal end may be less than the width W2 of an intermediate or proximal portion of the blade. As a result of the tapered nature of the tools, the tool members may be more readily transitioned between the tool member closed position and the tool member open position with less frictional resistance created by interaction with adjacent tool members during the opening and closing of the tool members.

The multipurpose tool 10 may be assembled in various manners. In an example embodiment, however, each handle 12 is formed of a plurality of handle portions, such as a pair of handle portions as described above. In this example embodiment, a handle portion may be positioned such that the outer sidewall 14 lays flat upon a surface, such as a table or desk. An axle 54 may be positioned through a corresponding opening defined by the outer sidewall so as to extend upwardly therefrom and one or more tool members 13 may then be stacked upon the axle. One or more tool members may then be positioned upon the axle. In order to increase the flexibility with which the tool members may be assembled, the tool members are uniform so as to be actuated and unlocked in an equivalent manner by either the right hand or the left hand of the user, thereby avoiding issues related to the handedness of the tool members. Once the desired tools have been stacked upon the axle, the other handle portion may be mounted upon the stacked tools and, in some embodiments, a screw may be inserted through the other handle portion so as to engage the axle. A jaw 34 may also be positioned within the channel defined by the handle. The jaws carried by a pair of handles may then be rotatably connected at the pivot point 36 to complete the assembly of a multipurpose tool.

By assembling the multipurpose tool 10 in this manner, the tool members may be mounted upon the axle 54 in a more controlled and systematic fashion. In addition, a user or supplier may customize the tool members or the relative location of the tool members included within the resulting multipurpose tool. To facilitate this configuration, each tool member may have the same thickness. Alternatively, the tool members may have different thickness selected from among a set of predetermined thicknesses, such as in increments of 0.02 inches or 0.04 inches.

Although a multipurpose tool 10 having multiple handles 12 has been described, such a description is provided by way of example but not of limitation as embodiments may be employed in conjunction with other types of tools. For example, the tool lock 70 and associated tool lock spring 90 as well as one or more magnets 52 may be utilized in conjunction with pocket knives and folding knives. In this regard, a pocket knife has a single handle with an axle upon which one or more tool members are rotatably mounted. The tool members are therefore configured to be rotated between open and closed positions. The pocket knife may include a tool lock as described above and a tool lock spring mounted upon the axle and configured to bias the tool lock into an engaged position with a recess defined by a tool member when the tool member is rotated into the open position. As such, the tool member may be secured in the open position until the tool lock is lifted into the disengaged position and the tool member is rotated to the closed position. The pocket knife of an example embodiment may also include one or more magnets carried by the handle, such as proximate the floor of the handle, to bias the tool members into a tool member closed position.

Similarly, a folding knife 120 has a single handle 12 that defines first and second channels opening through opposite sides of the handle, as shown in FIG. 35. The handle of a folding knife may include a floor disposed within and extending lengthwise through the handle in order to separate the first and second channels. The handle of the folding knife includes a respective axle 54 in each of the channels upon which one or more tool members 13 are rotatably mounted. The tool members are therefore configured to be rotated between open and closed positions. The axles may be positioned proximate opposite ends of the handle such that the open position of the tool members that reside within the first channel extends in the opposite direction than the open position of the tool members that reside within the second channel. The folding knife may include first and second tool locks 70 and first and second tool lock springs associated with the tool members in the first and second channels, respectively. As before, each tool lock spring is mounted upon a respective axle and configured to bias the associated tool lock into an engaged position with a recess defined by a tool member when the tool member is rotated from the respective channel into the open position. As such, the tool member may be secured in the open position until the tool lock is lifted into the disengaged position and the tool member is rotated to the closed position. As described above, the folding knife of an example embodiment may also include one or more magnets 52 carried by the handle, such as proximate the floor of the handle, to bias the tool members into a tool member closed position.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A multipurpose tool comprising:

first and second handles configured for relative movement between a closed position and an open position, wherein the first handle comprises a first axle extending thereacross, the second handle comprises a second axle extending thereacross, and wherein the first handle comprises a first cam surface and the second handle comprises a second cam surface;

first and second jaws rotatably connected to the first and second handles, respectively, wherein the first jaw defines an opening through which the first axle extends, and wherein the second jaw defines an opening through which the second axle extends;

third and fourth jaws rotatably connected to the second and first handles, respectively, wherein the third jaw defines an elongated opening through which the second axle extends, and wherein the fourth jaw defines an elongated opening through which the first axle extends;

first and second cam followers attached to the first and second jaws, respectively, wherein the first and second cam followers follow along the second and first cam surfaces, respectively, as the first and second handles move between the closed position and the open position; and third and fourth cam elements fixedly attached to the third and fourth jaws, respectively, wherein the third and fourth cam elements rotate relative to the second and first cam followers as the third and fourth jaws rotate from a stowed position within the second handle and first handle, respectively, to a deployed position, wherein the third and fourth cam elements bias the third and fourth jaws away from the first and second axles, respectively against a biasing force into engagement with the first and second jaws, respectively, in response to the third and fourth jaws being in the deployed position.

2. The multipurpose tool of claim 1, wherein the third and fourth jaws each define a cavity, wherein the first and second jaws are received into the cavity of the third and fourth jaw, respectively, when the first and second jaws are in the deployed position and the third and fourth jaws are in the deployed position.

3. The multipurpose tool of claim 2, wherein the first jaw is attached to the second handle through the second axle, wherein the third jaw is attached to the second handle through the second axle, and wherein the first jaw is received into the cavity of the third jaw.

4. The multipurpose tool of claim 3, wherein the second jaw is attached to the first handle through the first axle, wherein the fourth jaw is attached to the first handle through the first axle, and wherein the second jaw is received into the cavity of the fourth jaw.

5. The multipurpose tool of claim 1, wherein the third and fourth jaws each define a cavity comprising a flange extending to a respective tip of the third and fourth jaws, wherein the first and second jaws are received into the cavity of the third and fourth jaws, respectively, when the first jaw and the second jaw are in at least a partially opened orientation relative to one another.

6. The multipurpose tool of claim 5, wherein a tip of the first jaw and a tip of the second jaw engage a flange of the third jaw and a flange of the fourth jaw, respectively, when the first jaw and the second jaw are closed together.

7. The multipurpose tool of claim 6, wherein when the third jaw and fourth jaw are in the deployed position, pressure between the first jaw and the second jaw is transmitted to between the third jaw and the fourth jaw.

8. The multipurpose tool of claim 7, wherein the pressure between the first jaw and the second jaw is transmitted to between the third jaw and the first jaw through the flange of the third jaw and between the fourth jaw and the second jaw through the flange of the fourth jaw.

9. The multipurpose tool of claim 1, wherein in the deployed position, tips of the first jaw and the second jaw extend a first distance from a pivot point between the first jaw and the second jaw, wherein in the deployed position, tips of the third jaw and the fourth jaw extend a second distance from the pivot point between the first jaw and the second jaw, and wherein the second distance is greater than the first distance.

10. The multipurpose tool of claim 1, further comprising a first resilient member disposed in the elongated opening through which the first axle extends, and a second resilient member disposed in the elongated opening through which the second axle extends.

11. The multipurpose tool of claim 10, wherein the biasing force is provided to the third jaw by the first resilient member and the biasing force is provided to the fourth jaw by the second resilient member.

12. The multipurpose tool of claim 11, wherein the first resilient member and the second resilient member are each formed of an elastomeric material.

13. A multipurpose tool comprising:

a first handle and a second handle configured for relative movement between a closed position and an open position, wherein the first handle rotates about a first axis to the open position and the second handle rotates about a second axis to the open position;

a first jaw and a second jaw rotatably connected to each other at a third axis, wherein the first jaw is connected to the first handle at the first axis and the second jaw is connected to the second handle at the second axis;

a third jaw and a fourth jaw, wherein the third jaw is rotatably connected to the second handle at the second axis and the fourth jaw is rotatably connected to the first handle at the first axis;

a first cam surface attached to the first handle and a second cam surface attached to the second handle;

a third cam element attached to the third jaw and a fourth cam element attached to the fourth jaw, wherein in response to rotation of the third jaw about the second axis from within the second handle, the third cam element presses against the second cam surface and biases rotation of the third jaw off of the second axis to receive the first jaw within a cavity of the third jaw, and wherein in response to rotation of the fourth jaw about the first axis from within the first handle, the fourth cam element presses against the first cam surface and biases rotation of the fourth jaw off of the first axis to receive the second jaw within a cavity defined by the fourth jaw.

14. The multipurpose tool of claim 13, wherein a first flange is defined within the cavity defined by the third jaw and a second flange is defined within the cavity defined by the fourth jaw, wherein the first jaw is configured to press on the first flange and the second jaw is configured to press on the second flange in response to the first jaw and second jaw being closed together.

15. The multipurpose tool of claim 13, further comprising:

a first resilient member within the first handle; and a second resilient member within the second handle, wherein the first resilient member biases the rotation of the fourth jaw toward the first axis, and wherein the second resilient member biases the rotation of the third jaw toward the second axis.

* * * * *